(12) United States Patent
Baldemair et al.

(10) Patent No.: US 10,700,825 B2
(45) Date of Patent: Jun. 30, 2020

(54) REFERENCE SIGNAL PATTERN

(71) Applicant: Telefonaktiebolaget LM Ericsson (publ), Stockholm (SE)

(72) Inventors: Robert Baldemair, Solna (SE); Håkan Björkegren, Täby (SE); Erik Dahlman, Stockholm (SE); Stefan Parkvall, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 67 days.

(21) Appl. No.: 16/068,812

(22) PCT Filed: Sep. 28, 2016

(86) PCT No.: PCT/SE2016/050916
§ 371 (c)(1),
(2) Date: Jul. 9, 2018

(87) PCT Pub. No.: WO2017/123129
PCT Pub. Date: Jul. 20, 2017

(65) Prior Publication Data
US 2019/0028248 A1 Jan. 24, 2019

Related U.S. Application Data

(60) Provisional application No. 62/277,765, filed on Jan. 12, 2016.

(51) Int. Cl.
*H04L 5/00* (2006.01)

(52) U.S. Cl.
CPC .......... *H04L 5/0023* (2013.01); *H04L 5/0044* (2013.01); *H04L 5/0051* (2013.01); *H04L 5/0053* (2013.01)

(58) Field of Classification Search
CPC .............. H04L 1/1896; H04W 52/143; H04W 74/006; H04W 74/008; H04W 74/0833; H04W 88/187
See application file for complete search history.

(56) References Cited

U.S. PATENT DOCUMENTS 8,848,638 B2* 9/2014 Axmon ................. H04W 48/12
370/329
9,462,582 B2* 10/2016 Feng .................... H04L 27/2602
(Continued)

FOREIGN PATENT DOCUMENTS

EP   2 590 350 A1   5/2013
WO  2008 044882 A1  4/2008

OTHER PUBLICATIONS

PCT International Search Report for International application No. PCT/SE2016/050916—dated Nov. 30, 2016.
(Continued)

*Primary Examiner* — Phuc H Tran
(74) *Attorney, Agent, or Firm* — Baker Botts, LLP

(57) ABSTRACT

A method in a node (110, 115) comprises generating (704) a frame structure comprising at least a first subframe (305, 405, 505), the first subframe comprising a first symbol (310A, 510A) and a second symbol (310B, 510B), each of the first and second symbols comprising a plurality of resource elements. The method comprises reserving (708) one or more of the plurality of resource elements in the first symbol for reference signals (335A-G, 435A-G, 535A-G), modulating (712) one or more of the reserved resource elements in the first symbol with reference symbols (335B-D, 435B-D, 535B-D), the modulated one or more of the reserved resource elements in the first symbol comprising a subset of the one or more reserved resource elements that overlap in frequency domain the data transmission carried in the second symbol, and transmitting (716) the at least one subframe to another node.

21 Claims, 13 Drawing Sheets

(56) References Cited

U.S. PATENT DOCUMENTS

2012/0327894 A1    12/2012  Axmon et al.
2016/0366670 A1*   12/2016  Feng .................. H04L 27/2602

OTHER PUBLICATIONS

PCT International Preliminary Report on Patentability for International application No. PCT/SE2016/050916—dated Mar. 7, 2018.

* cited by examiner

REFERENCE SIGNAL PATTERN

PRIORITY

This nonprovisional application is a U.S. National Stage Filing under 35 U.S.C. § 371 of International Patent Application Serial No. PCT/SE2016/050916 filed Sep. 28, 2016, and entitled "REFERENCE SIGNAL PATTERN" which claims priority to U.S. Provisional Patent Application No. 62/277,765 filed Jan. 12, 2016 both of which are hereby incorporated by reference in their entirety.

TECHNICAL FIELD

The present disclosure relates, in general, to wireless communications and, more particularly, to reference signal patterns.

BACKGROUND

Release 14 will mark the start of 5G work in the 3rd Generation Partnership Project (3GPP). 5G will consist of Long Term Evolution (LTE) evolution together with a new radio-access technology, which is referred to as "NR" in the following.

FIG. 1 illustrates an example proposed frame structure for NR. More particularly, FIG. 1 illustrates two downlink (DL) subframes 5A and 5B (of the proposed frame structure and DL control channel structure). Each of subframes 5A and 5B include a number of orthogonal frequency division multiplexing (OFDM) symbols 10. Subframe 5A includes a first OFDM symbol 10A, a second OFDM symbol 10B, a third OFDM symbol 10C, and a fourth OFDM symbol 10D. Similarly, subframe 5B includes a first OFDM symbol 10E, a second OFDM symbol 10F, a third OFDM symbol 10G, and a fourth OFDM symbol 10H. Although FIG. 1 illustrates one example proposed frame structure for NR, other frame structures are possible. According to other potential frame structures for NR, each subframe 5A and 5B may include any suitable number of symbols. As one example, each subframe 5 may have 7 symbols. As another example, each subframe 5 may have 14 symbols.

Subframe 5A is divided into a control region 15A and a data region 20A. In the example of FIG. 1, control region 15A includes first OFDM symbol 10A, which contains control information. Data region 20A includes first, second and third OFDM symbols 10B, 10C, and 10D, respectively, which contain data. Similarly, subframe 5B is divided into a control region 15B and a data region 20B. In the example of FIG. 1, control region 15B includes first OFDM symbol 10E, which contains control information. Data region 20B includes second, third, and fourth OFDM symbols 10F, 10G, and 10H, respectively, which contain data.

In the proposed frame structure and DL control channel structure shown in FIG. 1, control region 15A of subframe 5A contains physical downlink control channel (PDCCH) 25A and 25B. Similarly, control region 15B of subframe 5B contains PDCCH 25C. Although the example of FIG. 1 illustrates two PDCCH in control region 15A of subframe 5A and a single PDCCH in control region 15B of subframe 5B, control regions 15A and 15B may include any suitable number of PDCCH. In some cases, control regions 15A and 15B may include zero, one, two or more PDCCH. Although the example of FIG. 1 illustrates control regions 15A and 15B as having a single OFDM symbol 10A and 10E, respectively, control regions consisting of more than one OFDM symbol are possible. Following OFDM symbols 10A and 10E with control information in control regions 15A and 15B, respectively, data regions 20A and 20B start. With respect to subframe 5A, data region 20A includes physical data channel (PDCH) 30A, which corresponds to PDCCH 25A, as indicated by the use of the same pattern in PDCH 30A as for PDCCH 25A in FIG. 1. PDCH 30A is scheduled by PDCCH 25A. Data region 20A also includes PDCH 30B, which corresponds to PDCCH 25B, as indicated by the use of the same pattern in PDCH 30B as for PDCCH 25B in FIG. 1. PDCH 30B is scheduled by PDCCH 25B. In the example of FIG. 1, PDCH 30A is a subframe aggregate that extends from subframe 5A into subframe 5B across OFDM symbols 10B to 10H, while PDCH 30B is contained entirely within subframe 5A across OFDM symbols 10B-10D. It is for further study whether OFDM symbols 10A and 10E of control regions 15A and 15B that carry control information can also carry data.

PDCCH to one particular user is carried on a subset of OFDM subcarriers. The mapping of PDCCH can either be distributed or localized (for simplicity, PDCCH 25A and 25B in the example of FIG. 1 are localized). PDCCH can carry, among other things, DL scheduling information indicating DL resources in the same subframe (as in the case of PDCCH 25B) and also subsequent subframes in the case of subframe aggregation (as in the case of PDCCH 25A, in which corresponding PDCH 30A is scheduled as a subframe aggregate). In the example of FIG. 1, a third PDCCH 25C is shown in the first OFDM symbol 10E of control region 15B of subframe 5B. PDCCH 25C is shown without corresponding DL PDCH (e.g., an uplink (UL) grant). A user equipment (UE) detects PDCCH addressed to it and derives from the scheduling information PDCH related information. A UE is not aware of PDCCH transmissions to other UEs.

Downlink reference signals (mainly Demodulation Reference Signals (DMRS), but potentially also other types of reference signals) should be transmitted early in the subframe to enable the receiver to perform early channel estimation, and by that reduce decoding time. Since the UE is not aware of PDCCH transmissions to other UEs, it does not know which subcarriers in the first OFDM symbol (e.g., OFDM symbol 10A of subframe 5A or OFDM symbol 10E of subframe 5B) are modulated. It is not straightforward to map PDCH to the first OFDM symbol of a subframe since PDCH would have to be mapped around other users' PDCCH, of which the UE is not aware. The same applies for reference signals. In addition, reference signals would have to be mapped around other users' PDCCH, of which the UE is not aware. This would lead to non-equally spaced reference signals with potentially large "holes" in frequency domain. An existing approach maps PDCH and reference signals starting with the second OFDM symbol (e.g., second symbols 10B or 10F in the example of FIG. 1) or, in case of a longer control region, with the OFDM symbol after the control region. Not transmitting reference signals in the beginning of the subframe also delays the time when the receiver can do channel estimation, and thus delays decoding.

SUMMARY

To address the foregoing problems with existing approaches, disclosed is a method in a node. The method comprises generating a frame structure comprising at least a first subframe, the first subframe comprising a first symbol and a second symbol, each of the first and second symbols comprising a plurality of resource elements, wherein the first symbol carries control information and the second symbol carries a data transmission. The method comprises reserving one or more of the plurality of resource elements in the first symbol for reference signals, and modulating one or more of the reserved resource elements in the first symbol with reference symbols, the modulated one or more of the reserved resource elements in the first symbol comprising a subset of the one or more reserved resource elements that overlap in frequency domain the data transmission carried in the second symbol. The method comprises transmitting the at least one subframe to another node.

In certain embodiments, the node may comprise one of: a network node; and a wireless device operating in a device-to-device scenario. The first and second symbols may be orthogonal frequency division multiplexing symbols. The reference signals may comprise demodulation reference signals. The control information may be carried on a Physical Downlink Control Channel and the data transmission may be carried on a Physical Data Channel. The control information may be carried in one or more reserved resource elements that are not modulated with reference symbols. The first symbol may also carry data.

In certain embodiments, the frame structure may further comprise a second subframe comprising a plurality of symbols. The data transmission carried in the second symbol of the first subframe may be a subframe aggregate data transmission that extends in time domain across at least one of the plurality of symbols of the second subframe. The method may comprise communicating information indicating which of the plurality of symbols within the subframe aggregate data transmission contain reference signals.

In certain embodiments, the method may comprise creating multiple orthogonal reference signals for a multiple-input-multiple-output (MIMO) transmission scheme. Creating multiple orthogonal reference signals for the MIMO transmission scheme may comprise one or more of: using frequency division multiplexing to separate reference signals; using code division multiplexing to separate reference signals; and using orthogonal cover codes between the reserved resource elements modulated with reference symbols in the first symbol and one or more of the plurality of resource elements in the second symbol.

Also disclosed is a node. The node comprises one or more processors. The one or more processors are configured to generate a frame structure comprising at least a first subframe, the first subframe comprising a first symbol and a second symbol, each of the first and second symbols comprising a plurality of resource elements, wherein the first symbol carries control information and the second symbol carries a data transmission. The one or more processors are configured to reserve one or more of the plurality of resource elements in the first symbol for reference signals. The one or more processors are configured to modulate one or more of the reserved resource elements in the first symbol with reference symbols, the modulated one or more of the reserved resource elements in the first symbol comprising a subset of the one or more reserved resource elements that overlap in frequency domain the data transmission carried in the second symbol. The one or more processors are configured to transmit the at least one subframe to another node.

Also disclosed is a method in a node. The method comprises receiving a first subframe comprising a first symbol and a second symbol, each of the first and second symbols comprising a plurality of resource elements, one or more of the plurality of resource elements in the first symbol reserved for reference signals, wherein the first symbol carries control information and the second symbol carries a data transmission. The method comprises decoding the control information carried in the first symbol, and obtaining scheduling information from the decoded control information, the scheduling information indicating a location of the data transmission in frequency domain. The method comprises determining, based on the location of the data transmission in frequency domain, which of the one or more reserved resource elements in the first symbol are modulated with reference symbols, and performing channel estimation using the one or more reserved resource elements in the first symbol that are modulated with reference symbols.

In certain embodiments, the first and second symbols may be orthogonal frequency division multiplexing symbols, and the reference signals may comprise demodulation reference signals. The node may comprise one of: a wireless device operating in downlink; a wireless device operating in a device-to-device scenario; and a network node operating in a wireless self-backhaul scenario. The control information may be carried on a Physical Downlink Control Channel and the data transmission may be carried on a Physical Data Channel. The first symbol may also carry data. In certain embodiments, the one or more reserved resource elements in the first symbol that are modulated with reference symbols may comprise a subset of the one or more reserved resource elements that overlap in frequency domain the data transmission carried in the second symbol.

In certain embodiments, the method may comprise receiving a second subframe comprising a plurality of symbols, wherein the data transmission carried in the second symbol of the first subframe is a subframe aggregate data transmission that extends in time domain across at least one of the plurality of symbols of the second subframe. The method may comprise obtaining information indicating which of the plurality of symbols within the subframe aggregate data transmission contain reference signals. In certain embodiments, the first subframe may include multiple orthogonal reference signals for a multiple-input-multiple-output (MIMO) transmission scheme.

In certain embodiments, the control information may be carried in one or more reserved resource elements that are not modulated with reference symbols. Decoding the control information may comprise: performing decoding as if the control information is mapped around the one or more reserved resource elements in the first symbol; and performing decoding as if the control information is mapped to the one or more reserved resource elements that are not modulated with reference symbols.

In certain embodiments, performing channel estimation using the one or more reserved resource elements in the first symbol that are modulated with reference symbols may comprise decoding the data transmission using the one or more reserved resource elements in the first symbol that are modulated with reference symbols.

Also disclosed is a node. The node comprises one or more processors. The one or more processors are configured to receive a first subframe comprising a first symbol and a second symbol, each of the first and second symbols comprising a plurality of resource elements, one or more of the plurality of resource elements in the first symbol reserved for reference signals, wherein the first symbol carries control information and the second symbol carries a data transmission. The one or more processors are configured to decode the control information carried in the first symbol. The one or more processors are configured to obtain scheduling information from the decoded control information, the scheduling information indicating a location of the data transmission in frequency domain. The one or more processors are configured to determine, based on the location of the data transmission in frequency domain, which of the one or more reserved resource elements in the first symbol are modulated with reference symbols; and perform channel estimation using the one or more reserved resource elements in the first symbol that are modulated with reference symbols.

Certain embodiments of the present disclosure may provide one or more technical advantages. For example, certain embodiments may advantageously enable transmission of reference signals in the first symbol otherwise used for transmission of control information. As another example, certain embodiments may advantageously increase resource utilization. As still another example, certain embodiments may advantageously reduce decoding delay at the receiver since channel estimation can be performed after the first symbol has been received. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
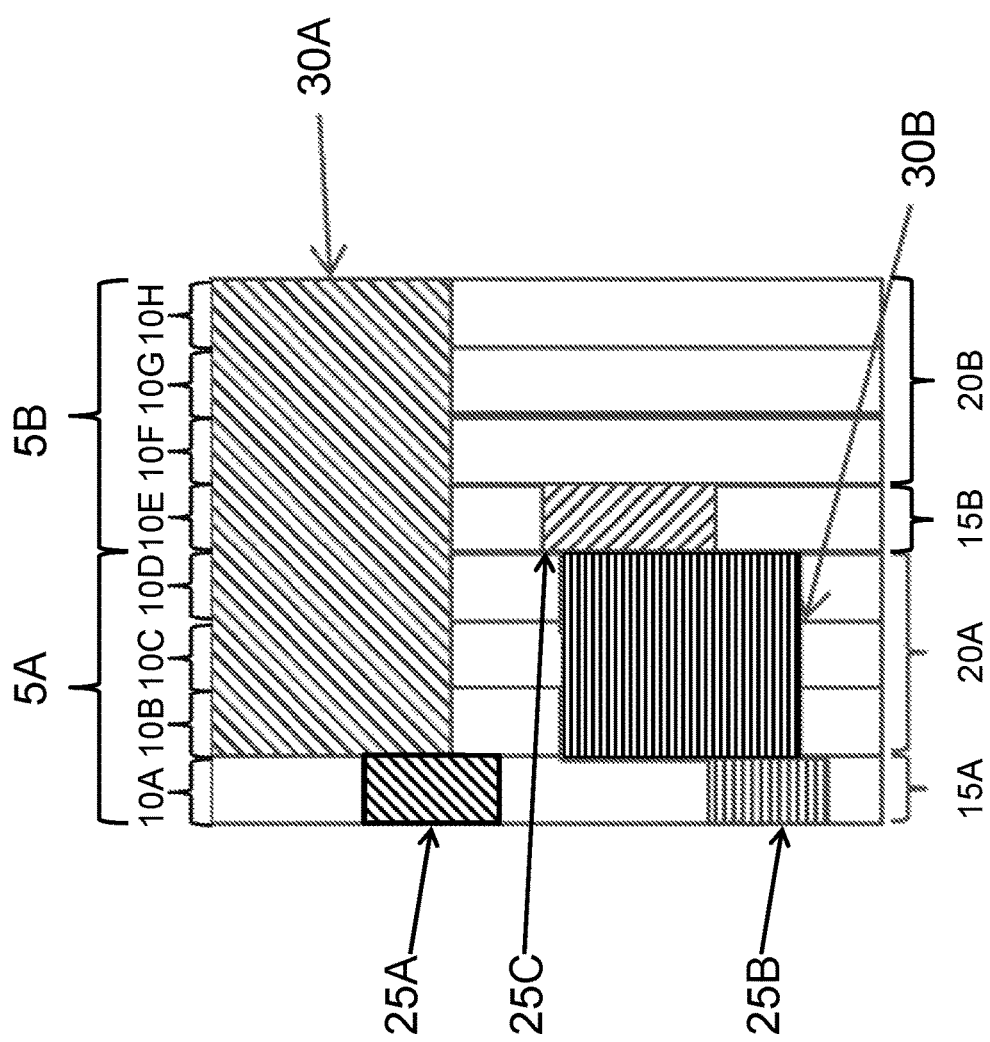
FIG. 1 illustrates an example proposed frame structure for NR.

As described above, because a UE is not aware of PDCCH transmissions to other UEs, the UE does not know which subcarriers in the first OFDM symbol of a subframe are modulated. It is not straightforward to map PDCH to the first OFDM symbol. This is because the PDCH would have to be mapped around other users' PDCCH, of which the UE is not aware. The same problem applies for reference signals. Existing approaches that map PDCH and reference signals starting with the second OFDM symbol suffer from certain deficiencies. For example, not transmitting reference signals in the beginning of the subframe delays the time when the receiver can perform channel estimation, and thus delays decoding.

The present disclosure contemplates various embodiments that may address these and other deficiencies associated with existing approaches. In certain embodiments, this is achieved using a reserved resource element pattern defined in an OFDM symbol carrying control information. In some cases, the first OFDM symbol in a subframe contains a pattern of resource elements (i.e., subcarriers) that are reserved for reference signals. When PDCH is transmitted in the subframe, the reserved resource elements that overlap with PDCH in frequency domain in the same subframe are modulated with reference symbols. A UE can decode PDCCH and obtain scheduling information that contains, among other things, the frequency location of PDCH. The UE can assume reference symbols are transmitted at those reserved resource elements in the first OFDM symbol that overlap in frequency with its PDCH allocation.

According to one example embodiment, a method in a node is disclosed. In certain embodiments, the node may be a wireless device (such as a UE) or a network node. The node generates a frame structure comprising at least a first subframe. The first subframe comprises a first symbol and a second symbol. Each of the first and second symbols comprise a plurality of resource elements. The first symbol carries control information, and the second symbol carries a data transmission. The node reserves one or more of the plurality of resource elements in the first symbol for reference signals, and modulates one or more of the reserved resource elements in the first symbol with reference symbols. The modulated one or more of the reserved resource elements in the first symbol comprise a subset of the one or more reserved resource elements that overlap in frequency domain the data transmission carried in the second symbol. The node transmits the at least one subframe to another node.

According to another example embodiment, a method in a node is disclosed. In certain embodiments, the node may be a wireless device (such as a UE) or a network node. The node receives a first subframe comprising a first symbol and a second symbol. Each of the first and second symbols comprise a plurality of resource elements. One or more of the plurality of resource elements in the first symbol are reserved for reference signals. The first symbol carries control information, and the second symbol carries a data transmission. The node decodes the control information carried in the first symbol, and obtains scheduling information from the decoded control information. The scheduling information indicates a location of the data transmission in frequency domain. The node determines, based on the location of the data transmission in frequency domain, which of the one or more reserved resource elements in the first symbol are modulated with reference symbols. The node performs one or more operations using the one or more reserved resource elements in the first symbol that are modulated with reference symbols. As one example, the node may decode the data transmission using the one or more reserved resource elements in the first symbol that are modulated with reference symbols. As another example, the node may perform channel estimation using the one or more reserved resource elements in the first symbol that are modulated with reference symbols.

The various embodiments described herein may address the deficiencies associated with existing approaches that delay the time when the receiver can perform channel estimation and thus delay decoding. For example, certain embodiments may advantageously enable transmission of reference signals in the first OFDM symbol otherwise used for transmission of PDCCH. This may advantageously increase resource utilization, and also reduce decoding delay at the receiver since channel estimation can be performed after the first symbol has been received.

Figure 2:
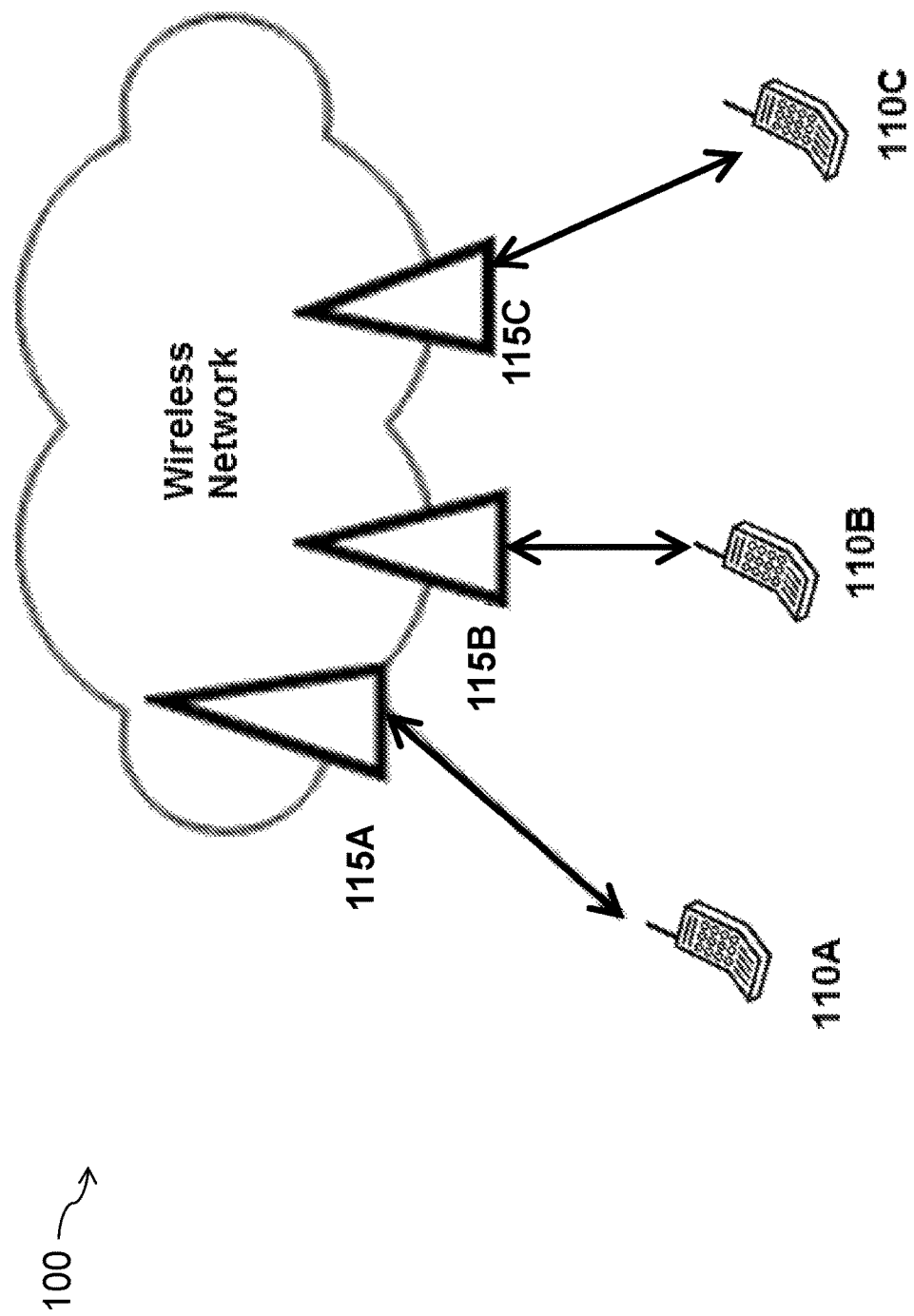
FIG. 2 is a schematic diagram of a wireless communication network, in accordance with certain embodiments.

FIG. 2 is a schematic diagram of a wireless communication network 100, in accordance with certain embodiments. Network 100 includes one or more UE(s) 110 (which may be interchangeably referred to as wireless devices 110) and network node(s) 115 (which may be interchangeably referred to as eNodeBs (eNBs) 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have D2D capability. Thus, UEs 110 may be able to receive signals from and/or transmit signals directly to another UE. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be performed by network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

In some embodiments, the non-limiting term "UE" is used. As described above, example embodiments of network 100 may include one or more UEs 110, and one or more different types of network nodes capable of communicating (directly or indirectly) with UEs 110. UEs 110 described herein can be any type of wireless device capable of communicating with network nodes 115 or another UE over radio signals. UE 110 may also be a radio communication device, target device, device-to-device (D2D) UE, machine-type-communication UE or UE capable of machine to machine communication (M2M), a sensor/actuator equipped with UE, iPad, Tablet, mobile terminals, smart phone, laptop embedded equipped (LEE), laptop mounted equipment (LME), USB dongles, Customer Premises Equipment (CPE), or any other suitable device.

Also, in some embodiments non-limiting generic terminology "network node" is used. It can be any kind of network node, which may comprise a Node B, base station (BS), radio base station, multi-standard radio (MSR) radio node such as MSR BS, eNode B, network controller, radio network controller (RNC), multi-cell/multicast coordination entity (MCE), base station controller (BSC), relay node, base transceiver station (BTS), access point (AP), radio access point, transmission points, transmission nodes, remote radio unit (RRU), remote radio head (RRH), nodes in distributed antenna system (DAS), core network node (e.g. MSC, MME, SON node, coordinating node, etc.), O&M, OSS, positioning node (e.g. E-SMLC), MDT, an external node (e.g., third-party node, a node external to the current network), or any suitable network node.

Example embodiments of UEs 110, network nodes 115, and other network nodes (such as radio network controller or core network node) are described in more detail with respect to FIGS. 9-13 below.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in an LTE network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to NR, LTE, LTE-Advanced, UMTS, HSPA, GSM, cdma2000, WiMax, WiFi, another suitable radio access technology, or any suitable combination of one or more radio access technologies.

As described above, the present disclosure contemplates various embodiments that use a reserved resource element pattern defined in an OFDM symbol carrying control information, such as the first OFDM symbol of a control region of a subframe. When PDCH is transmitted in the subframe, the reserved resource elements that overlap with PDCH in frequency domain are modulated with reference symbols. A node, such as wireless device 110 or network node 115, can decode the PDCCH addressed to it and obtain scheduling information that contains, among other things, the frequency location of PDCH. The node can assume reference symbols are transmitted at those reserved resource elements in the first OFDM symbol that overlap in frequency with its PDCH allocation.

For example, in certain embodiments a node, such as network node 115, generates a frame structure having at least a first subframe. The first subframe has at least a first symbol and a second symbol. The first and second symbols may be any suitable type of symbols. As one example, the first and second symbols may be orthogonal frequency division multiplexing symbols. Each of the first and second symbols have a plurality of resource elements. The first symbol carries control information and the second symbol carries a data transmission. The control information may be carried on a Physical Downlink Control Channel and the data transmission may be carried on a Physical Data Channel. The present disclosure contemplates that the first and second symbols may carry any suitable type of information in addition to control information and data transmission, respectively. For example, in certain embodiments the first symbol may also carry data.

Network node 115 reserves one or more of the plurality of resource elements in the first symbol for reference signals. The reference signals may be any suitable type of reference signals. As one example, the reference signals may be DMRS. Network node 115 modulates one or more of the reserved resource elements in the first symbol with reference symbols. The modulated one or more of the reserved resource elements in the first symbol may be a subset of the one or more reserved resource elements that overlap in frequency domain the data transmission carried in the second symbol. In certain embodiments, network node 115 may adapt the reference signal density to channel conditions. Network node 115 transmits the at least one subframe to another node, such as for example, wireless device 110.

According to another example embodiment, a node (such as UE 110), receives the first subframe including the first symbol and the second symbol. As described above, each of the first and second symbols include a plurality of resource elements. One or more of the plurality of resource elements in the first symbol are reserved for reference signals. The first symbol carries control information and the second symbol carries a data transmission.

UE 110 decodes the control information carried in the first symbol, and obtains scheduling information from the decoded control information. The scheduling information indicates a location of the data transmission in frequency domain. UE 110 determines, based on the location of the data transmission in frequency domain, which of the one or more reserved resource elements in the first symbol are modulated with reference symbols. In some cases, the one or more reserved resource elements in the first symbol that are modulated with reference symbols comprise a subset of the one or more reserved resource elements that overlap in frequency domain the data transmission carried in the second symbol.

UE 110 performs one or more operations using the one or more reserved resource elements in the first symbol that are modulated with reference symbols. As one example, UE 110 may perform channel estimation using the one or more reserved resource elements in the first symbol that are modulated with reference symbols. As another example, UE 110 may decode the data transmission using the one or more reserved resource elements in the first symbol that are modulated with reference symbols.

In certain embodiments, the frame structure generated by network node 115 may include a second subframe that also has a plurality of symbols. The data transmission carried in the second symbol of the first subframe may be a subframe aggregate data transmission that extends in time domain across at least one of the plurality of symbols of the second subframe, as described in detail below with respect to FIG. 4. Network node 115 communicates information indicating which of the plurality of symbols within the subframe aggregate data transmission contain reference signals.

In such an embodiment, UE 110 receives the second subframe, which includes a plurality of symbols. The data transmission carried in the second symbol of the first subframe is a subframe aggregate data transmission that extends in time domain across at least one of the plurality of symbols of the second subframe. UE 110 obtains information indicating which of the plurality of symbols within the subframe aggregate data transmission contain reference signals. The information indicating which of the plurality of symbols within the subframe aggregate data transmission contain reference signals may be obtained in any suitable manner. For example, in certain embodiments UE 110 may receive the information indicating which of the plurality of symbols within the subframe aggregate data transmission contain reference signals from network node 115.

In certain embodiments, network node 115 creates multiple orthogonal reference signals for a MIMO transmission scheme. Network node 115 may create the multiple orthogonal reference signals for the MIMO transmission scheme in any suitable manner, as described in detail below with respect to FIG. 5. As one example, network node 115 may use frequency division multiplexing to separate reference signals. As another example, network node 115 may use code division multiplexing to separate reference signals. As still another example, network node 115 may use orthogonal cover codes between the reserved resource elements modulated with reference symbols in the first symbol and one or more of the plurality of resource elements in the second symbol. In such a case, the first subframe received by UE 110 may include multiple orthogonal reference signals for the MIMO transmission scheme.

Although the example embodiments described above may be described in terms of network node 115 and UE 110 performing certain steps, the present disclosure contemplates that the various embodiments may be performed by any suitable node. For example, in certain embodiments the steps described above as being performed by network node 115 may be performed by UE 110, for example when UE 110 is operating in a device-to-device scenario. As another example, the steps described above as being performed by UE 110 may be performed by network node 115, for example when network node 115 is operating in a wireless self-backhaul scenario.

Figure 3:
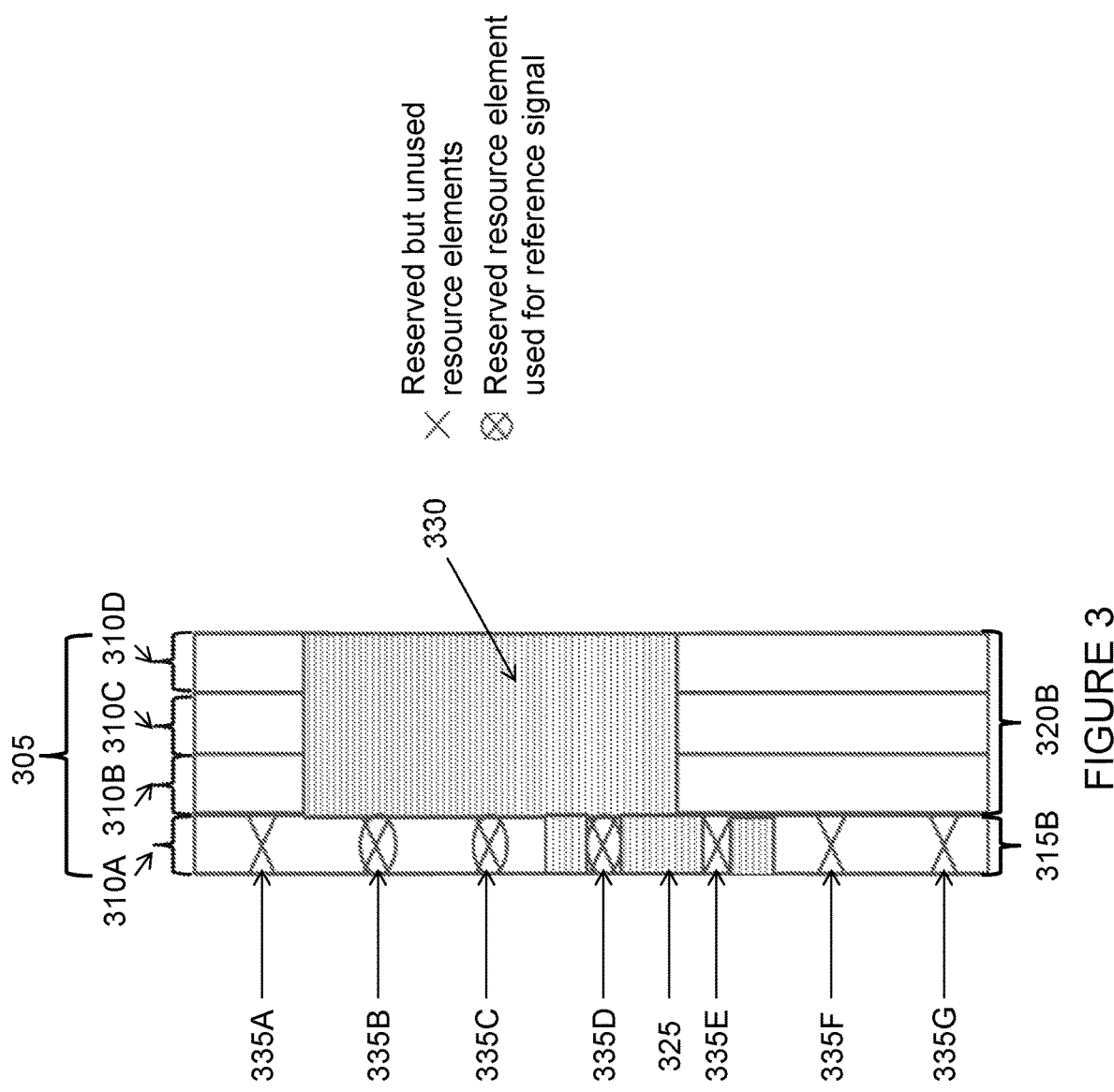
FIG. 3 illustrates a subframe where the first OFDM symbol contains resource elements reserved for reference symbols, in accordance with certain embodiments.

FIG. 3 illustrates a subframe where the first OFDM symbol contains resource elements reserved for reference symbols, in accordance with certain embodiments. More particularly, FIG. 3 illustrates a subframe 305 having a first OFDM symbol 310A, a second OFDM symbol 310B, a third OFDM symbol 310C, and a fourth OFDM symbol 310D. Subframe 305 has a control region 315B that includes first OFDM symbol 310A, and a data region 320B that includes second OFDM symbol 310B, third OFDM symbol 310C, and fourth OFDM symbol 310D. First OFDM symbol 310A in control region 315B can contain PDCCH. In the example of FIG. 3, first OFDM symbol 310A contains PDCCH 325, which schedules PDCH 330 starting from second OFDM symbol 310B on. First OFDM symbol 310A includes a plurality of resource elements 335A-G that are reserved for reference signals. A subset of the reserved resource elements 335A-G are actually modulated by reference symbols. In the example of FIG. 3, reserved resource elements 335B, 335C, and 335D that overlap with PDCH 330 in frequency domain carry reference symbols. Thus, while each of resource elements 335A-G in first OFDM symbol 310A are reserved for reference signals, only resource elements 335B, 335C, and 335D are actually modulated by reference symbols, as indicated by the 0 symbol in FIG. 3. The reserved resource elements 335B, 335C, and 335D that are modulated with reference symbols overlap with scheduled PDCH 330 bandwidth.

After a UE has detected PDCCH 325, it obtains information related to potential downlink PDCH transmission 330. The UE can assume that reserved resource elements 335 in first OFDM symbol 310A that overlap with PDCH 330 in frequency domain are modulated with reference signals (in the example of FIG. 3, these include reserved resource elements 335B, 335C, and 335D). The most common case would be DMRS associated with PDCH to aid demodulation of PDCH 330. Additional reference signals might be embedded within PDCH. In such a case, PDCH is mapped around resource elements modulated with reference symbols.

Figure 4:
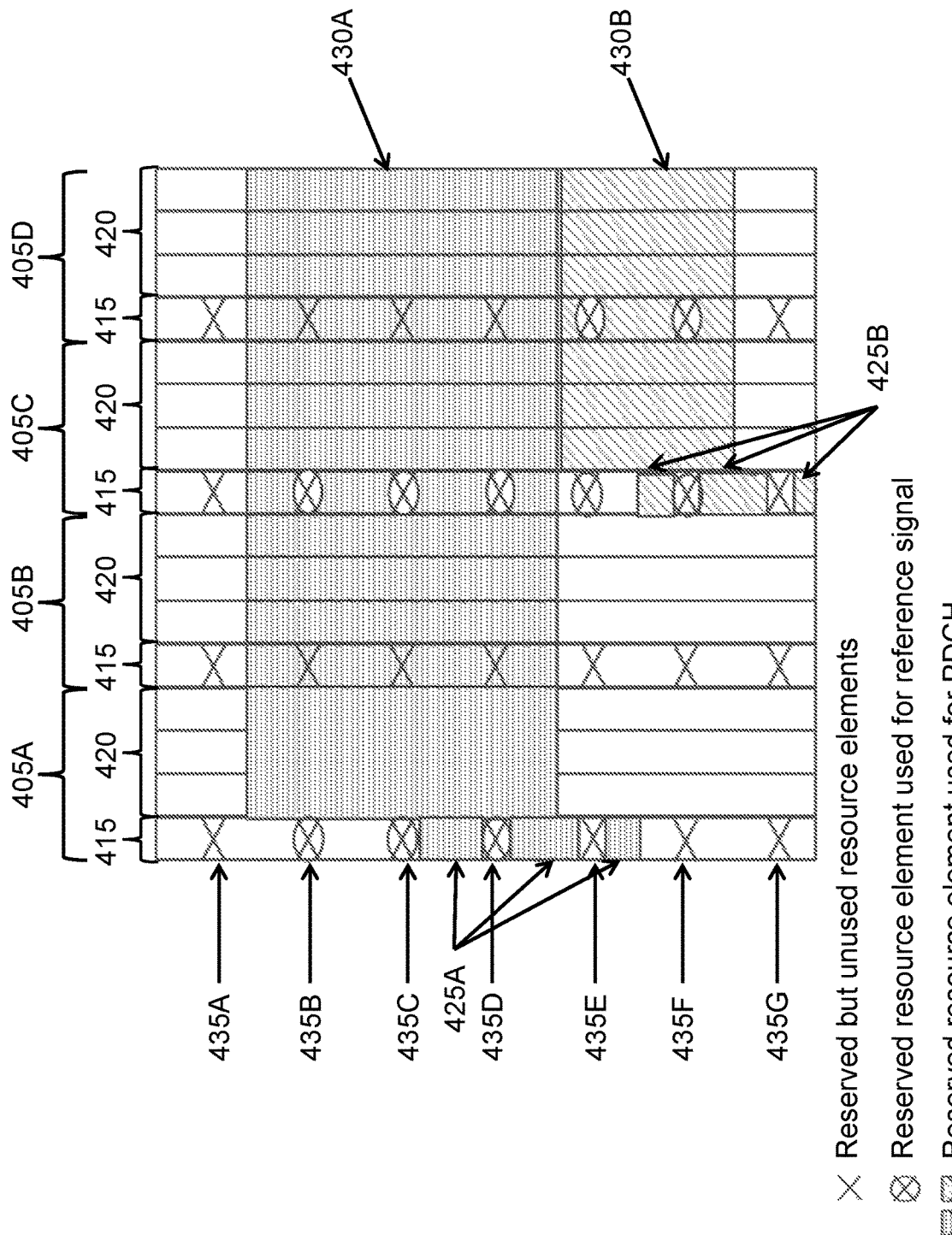
FIG. 4 illustrates a generalization of FIG. 3 in which multiple subframes are visible, in accordance with certain embodiments.

FIG. 4 illustrates a generalization of FIG. 3 where multiple subframes are visible, in accordance with certain embodiments. More particularly, FIG. 4 illustrates a first subframe 405A, a second subframe 405B, a third subframe 405C, and a fourth subframe 405D. Each of subframes 405A-D includes a control region 415 having a single OFDM symbol containing control information, and a data region 420 having three OFDM symbols containing data. In the example of FIG. 4, two PDCCH 425A and 425B and two PDCH 430A and 430B are scheduled within the four subframes 405A-D. PDCCH 425A and PDCCH 425B are mapped around reserved resource elements. PDCCH 425A in control region 415 of subframe 405A schedules PDCH 430A. PDCH 430A is a subframe aggregate data transmission consisting of four subframes 405A-D.

Resource elements 435A-G that are reserved for reference signals exist in control regions 415 of subframes 405A-D (i.e., all subframes that can carry PDCCH). However, not all reserved resource elements that overlap PDCH 430A in frequency domain must carry reference symbols. As shown in the example of FIG. 4, only reserved resource elements in control regions 415 of first subframe 405A and third subframe 405C overlapping PDCH 430A in frequency domain carry reference symbols (as shown by the ⊗ symbol in FIG. 4). Reserved resource elements overlapping PDCH 430A in control region 415 of second subframe 405B and fourth subframe 405D are not used for reference signals. Rather, in the example of FIG. 4 they carry modulation symbols of PDCH 430A. Depending on the rate of channel changes, more or less reference signals are needed in time. In the example of FIG. 4, every second subframe (i.e., first subframe 405A and third subframe 405C) is sufficiently dense.

In certain embodiments, information about which OFDM symbols within a subframe aggregate (such as PDCH 430A) contain reference signals is communicated to the UE. The information about which OFDM symbols within the subframe aggregate contain reference signals may be communicated to the UE in any suitable manner. As one example, in certain embodiments the OFDM symbols within the subframe aggregate that contain reference signals may be fixed (in this case, however it would not be possible to adopt the reference signal density to channel conditions). As another example, the OFDM symbols within the subframe aggregate that contain reference signals could be semi-statically configured, for example by any suitable network entity such as network node 115. As still another example, the OFDM symbols within the subframe aggregate that contain reference signals could be part of the scheduling information conveyed in PDCCH 425A, for example by network node 115. The present disclosure contemplates that the scheduling information may be conveyed in any suitable manner.

In the example of FIG. 4, PDCCH 425B in control region 415 of third subframe 405C schedules PDCH 430B. As shown in FIG. 4, PDCH 430B lasts for two subframes (i.e., third subframe 405C and fourth subframe 405D). Reserved resource elements 435E and 435F that overlaps PDCH 430B in frequency domain carry reference symbols in both third subframe 405C and fourth subframe 405D.

In addition to reference symbols transmitted on reserved resource elements 435, reference symbols can be modulated on other resource elements as well.

Although the examples of FIG. 3 and FIG. 4 described above show localized PDCH and PDCCH, this is for purposes of example only. The present disclosure contemplates that distributed transmission can be used as well.

The frequency granularity is typically not a single subcarrier, but a group of subcarriers that are scheduled together. In LTE, this is called a resource block. Typically, resource allocations for both PDCCH and PDCH are expressed in terms of resource blocks. Reserved resource elements are likely to be arranged in a way to repeat itself across resource block. To illustrate, assume a resource block consists of 16 subcarriers, a possible pattern for the reserved resource elements could then be $k+n\Delta$, where k is an (configurable) offset, n is the index within the reference signal sequence, and $\Delta$ the spacing of reserved resource elements. For a resource block size 16, typical values of $\Delta$ would be 2, 4, 8 or 16, which would lead to identical reserved resource element pattern across resource block.

Figure 5:
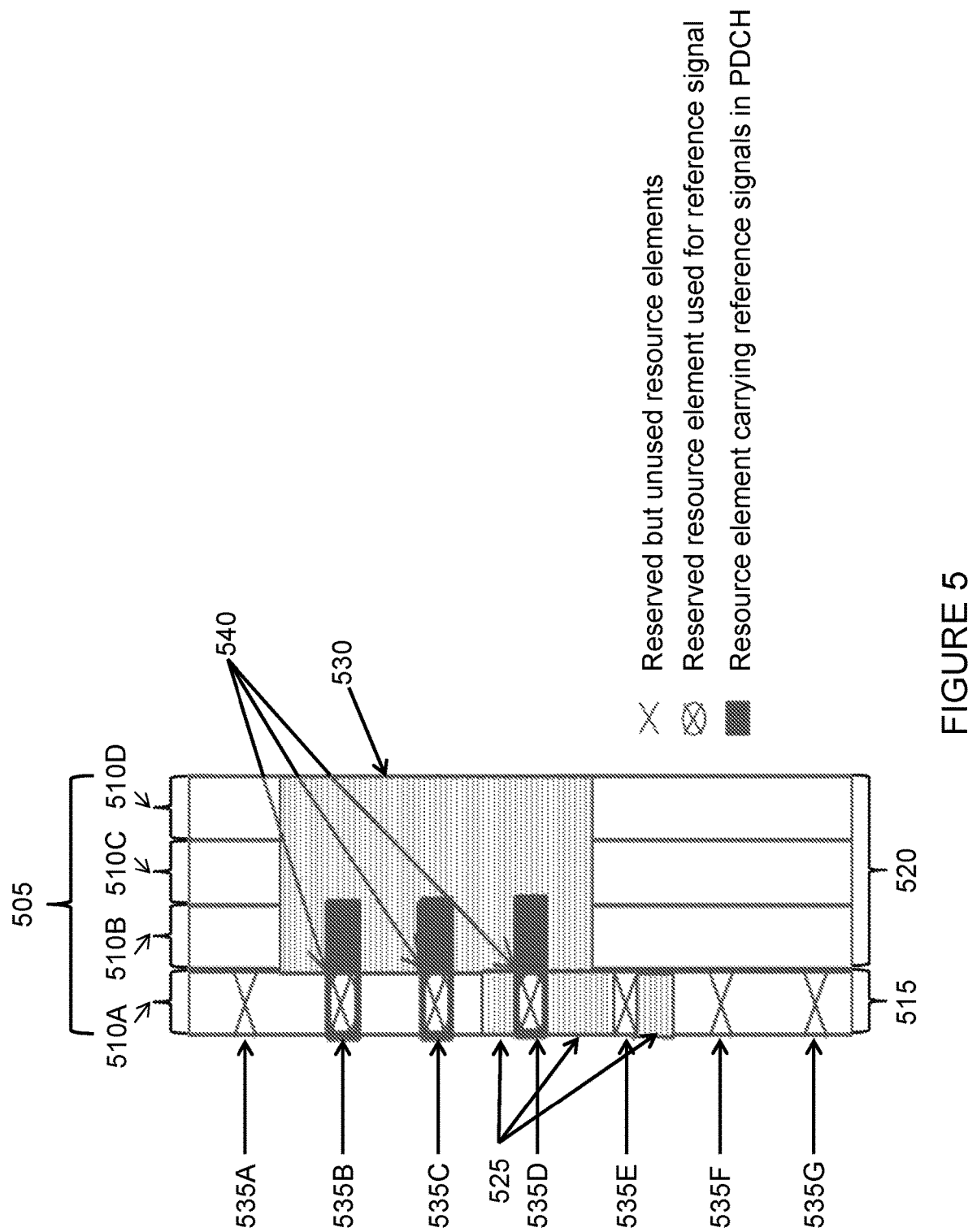
FIG. 5 illustrates orthogonal cover codes between used reserved resource elements in the first OFDM symbol and resource elements in a second OFDM symbol, in accordance with certain embodiments.

FIG. 5 illustrates orthogonal cover codes between used reserved resource elements in the first OFDM symbol and resource elements in a second OFDM symbol, in accordance with certain embodiments. More particularly, FIG. 5 illustrates a subframe 505 having a first OFDM symbol 510A, a second OFDM symbol 510B, a third OFDM symbol 510C, and a fourth OFDM symbol 510D. Subframe 505 has a control region 515 that includes first OFDM symbol 510A, and a data region 520 that includes second OFDM symbol 510B, third OFDM symbol 510C, and fourth OFDM symbol 510D. First OFDM symbol 510A in control region 515 contains PDCCH 525 and reserved resource elements 535A-G. PDCCH 525 is mapped around reserved resource elements 535D and 535E. PDCCH 525 schedules PDCH 530 starting from second OFDM symbol 510B on. For several MIMO transmission schemes, multiple orthogonal reference signals must be created. FIG. 5 illustrates one example embodiment, which uses orthogonal cover codes (OCC) 540 between used (i.e. overlapping with PDCH 530 in frequency domain) reserved resource elements 535B-D in first OFDM symbol 510A and resource elements in second OFDM symbol 510B. Although FIG. 5 illustrates the use of OCC, several designs exist.

One example design uses Frequency Division Multiplexing (FDM) to separate reference signals (i.e., each reference signal is assigned to a non-overlapping subset of the reserved resource element positions). For example, if L orthogonal reference signals should be created, each signal is assigned to every L-th reserved resource element. Using the reserved resource element pattern $k+n\Delta$, the l-th orthogonal reference signal could be mapped onto resource elements $k+l\Delta+n\Delta L$, where $k=0, 1, \ldots, L-1$. This is also referred to as frequency domain comb. In this case, reserved resource elements overlapping PDCH in frequency domain can remain empty if they are not part of the frequency domain comb.

Another example design uses Code Division Multiplexing (CDM) to separate reference signals. Orthogonal sequences are mapped to the same reserved resource element positions.

Example sequences include, but are not limited to, Hadamard codes, cyclically shifted Zadoff-Chu sequences, or any other Constant Amplitude Zero Auto Correlation (CAZAC) sequences.

As described above with respect to FIG. 5, another example design uses OCC in time between allocated reserved resource elements in the first OFDM symbol and resource elements in another OFDM symbol. The example of FIG. 5 illustrates OCC between used reserved resource elements in first OFDM symbol 510A and resource elements in second OFDM symbol 510B, in accordance with certain embodiments.

The present disclosure contemplates that any suitable design or combination of designs may be used. For example, in certain embodiments any suitable combination of one or more of the above described designs may be used.

Although certain example embodiments described above have assumed PDCCH is transmitted in the first OFDM symbol of a subframe, this is for purposes of example only. The present disclosure is not limited to such example embodiments. Rather, the present disclosure contemplates that the various embodiments described herein are applicable to scenarios in which PDCCH is transmitted over multiple OFDM symbols and/or if PDCCH is transmitted in another OFDM symbol than the first one in a subframe.

As described above, it is for further study if the OFDM symbol carrying control information can also carry data. Regardless, the various embodiments described herein are applicable to both designs.

Although certain example embodiments described above have assumed that PDCCH and reference signals are transmitted in the first OFDM symbol, the present disclosure is not limited to such examples and contemplates that the various embodiments described herein are applicable to scenarios in which PDCH is transmitted in the first OFDM symbol. In such a case, even PDCH is mapped around reserved resource elements (except with respect to the description of FIG. 4 where reserved resource elements in later subframes of a subframe aggregate can be used for PDCH).

Although certain example embodiments described above have assumed that PDCCH is mapped around reserved resources, the present disclosure contemplates that the various embodiments described herein can be applied so that PDCCH can use unused reserved resource elements (i.e., reserved resource elements not overlapping any PDCH in frequency-domain). In such a scenario, the UE has to blindly decode both possibilities (i.e., the case if PDCCH is mapped around reserved resource elements or if PDCCH is also mapped to the reserved resource elements).

Throughout the description, downlink has been assumed. This is for purposes of illustration and example only. The present disclosure contemplates that the various embodiments described herein are applicable to any other suitable scenario. For example, the various embodiments described herein may be applied in a wireless self-backhaul or device-to-device scenario (sidelinks) where one node transmits to another node. As another example, the various embodiments described herein may be applied for the sidelink that transmits the scheduling command (e.g., PDCCH) and the corresponding data channel (e.g., PDCH).

Although certain of the example embodiments are described in terms of OFDM, this is for purposes of example only. The present disclosure is not limited to such example embodiments. Rather, the present disclosure contemplates that the various embodiments are applicable to any transmission scheme that enables access to the frequency domain with fine granularity (e.g., subcarriers). This includes, for example, any kind of multicarrier systems (e.g., Filterbank Multicarrier (FBMC) based systems) as well as precoded multi-carrier systems (such as, for example, Discrete Fourier Transform Spread OFDM (DFTS-OFDM), Single Carrier Frequency Division Multiple Access (SC-FDMA), and filterbank-precoded FBMC).

Figure 6:
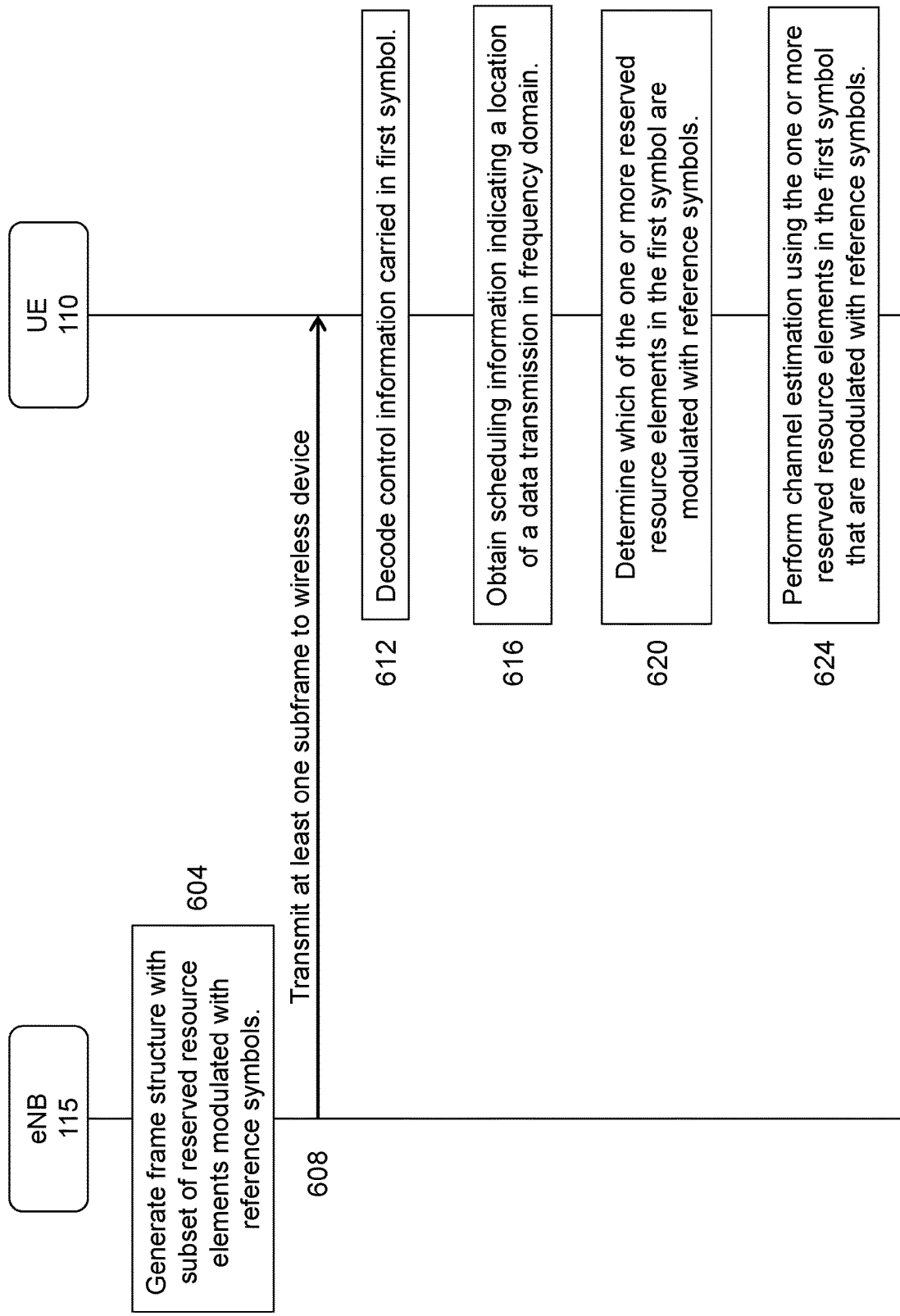
FIG. 6 illustrates a signal flow diagram, in accordance with certain embodiments.

FIG. 6 illustrates an example signal flow diagram, in accordance with certain embodiments. At step 604, a node, such as eNB 115, generates a frame structure with a subset of reserved resource elements modulated with reference symbols. The frame structure may include at least one subframe. The at least one subframe may include a plurality of symbols. The plurality of symbols may be OFDM symbols. A first symbol of the at least one subframe includes a plurality of resource elements reserved for reference signals. A subset of the resource elements reserved for reference signals are actually modulated with reference symbols. As described above, in certain embodiments the reserved resource elements actually modulated with reference symbols are those reserved resource elements that overlap with a data transmission (e.g., PDCH) in subsequent symbols of the at least one subframe (and possibly additional subframes in the case of subframe aggregation).

At step 608, eNB 115 transmits the at least one subframe to another node, such as UE 110. The transmitted at least one subframe is received by UE 110. UE 110 decodes control information carried in the first symbol of the received subframe. At step 616, the UE obtains scheduling information from the decoded control information carried in the first symbol of the received at least one subframe. The obtained scheduling information indicates a location of a data transmission (e.g., PDCH) in frequency domain.

At step 620, UE 110 determines which of the one or more reserved resource elements in the first symbol are modulated with reference symbols. In certain embodiments, UE 110 determines which of the one or more reserved resource elements are modulated with reference symbols based on which of the resource elements reserved for reference signals overlap in frequency domain with the data transmission indicated by the obtained scheduling information.

At step 624, UE 110 performs channel estimation using the one or more reserved resource elements in the first symbol that are modulated with reference symbols. The present disclosure contemplates that UE 110 may perform channel estimation in any suitable manner. In certain embodiments, in addition to or instead of performing channel estimation, UE 110 may decode the data transmission using the one or more reserved resource elements in the first symbol that are modulated with reference symbols. The present disclosure contemplates that UE 110 may perform any suitable operations using the one or more reserved resource elements in the first symbol that are modulated with reference symbols, in addition to or instead of performing channel estimation.

Figure 7:
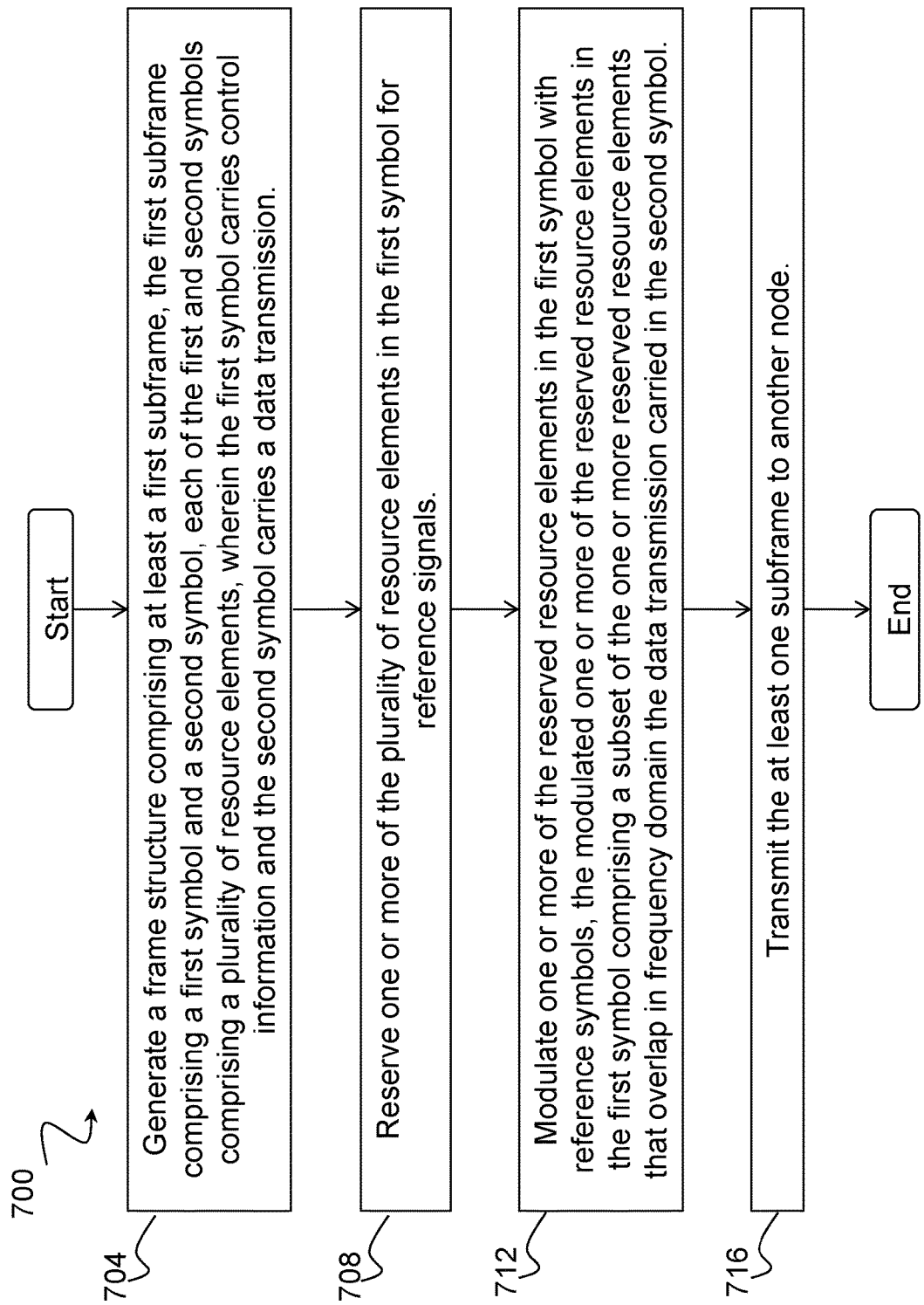
FIG. 7 is a flow chart of a method in a node, in accordance with certain embodiments.

FIG. 7 is a flow chart of a method in a node, in accordance with certain embodiments. At step 704, the node generates a frame structure comprising at least a first subframe. The first subframe comprises a first symbol and a second symbol. Each of the first and second symbols comprise a plurality of resource elements. The first symbol carries control information and the second symbol carries a data transmission. The first symbol may also carry data. In certain embodiments, the control information may be carried on PDCCH and the data transmission may be carried on PDCH. The control information may be carried in one or more reserved resource elements that are not modulated with reference symbols. The first and second symbols may be orthogonal frequency division multiplexing symbols. In certain embodiments, the node may comprise one of: a network node; and a wireless device operating in a device-to-device scenario.

At step 708, the node reserves one or more of the plurality of resource elements in the first symbol for reference signals. In certain embodiments, the reference signals may comprise demodulation reference signals.

At step 712, the node modulates one or more of the reserved resource elements in the first symbol with reference symbols. The modulated one or more of the reserved resource elements in the first symbol comprise a subset of the one or more reserved resource elements that overlap in frequency domain the data transmission carried in the second symbol.

At step 716, the node transmits the at least one subframe to another node.

In certain embodiments, the frame structure may further comprise a second subframe comprising a plurality of symbols. The data transmission carried in the second symbol of the first subframe may be a subframe aggregate data transmission that extends in time domain across at least one of the plurality of symbols of the second subframe. The method may comprise communicating information indicating which of the plurality of symbols within the subframe aggregate data transmission contain reference signals.

In certain embodiments, the method may comprise creating multiple orthogonal reference signals for a MIMO transmission scheme. In some cases, creating multiple orthogonal reference signals for the MIMO transmission scheme may comprise one or more of: using frequency division multiplexing to separate reference signals; using code division multiplexing to separate reference signals; and using orthogonal cover codes between the reserved resource elements modulated with reference symbols in the first symbol and one or more of the plurality of resource elements in the second symbol.

Figure 8:
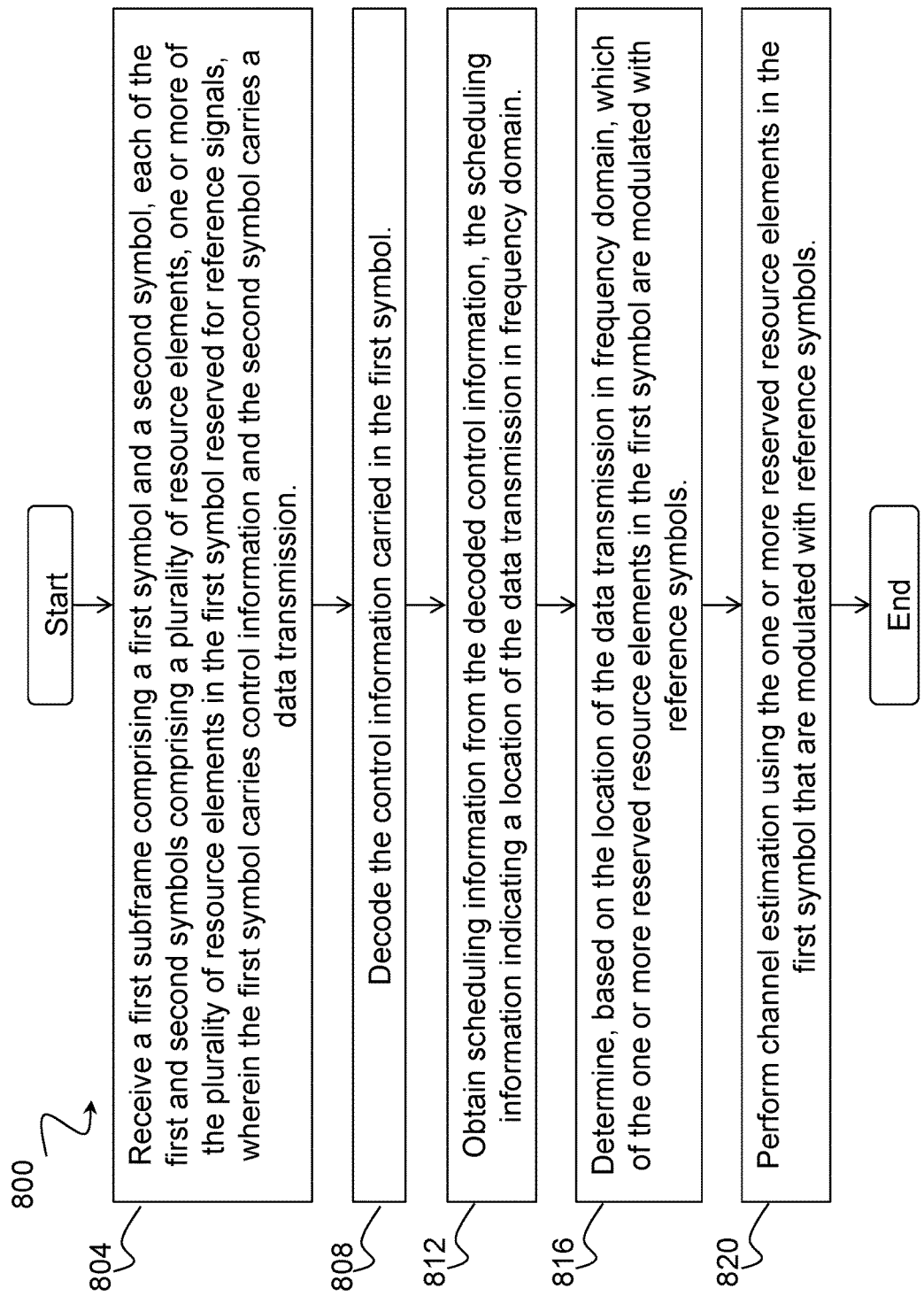
FIG. 8 is a flow chart of a method in a node, in accordance with certain embodiments.

FIG. 8 is a flow diagram of a method in a node, in accordance with certain embodiments. The method begins at step 804, where the node receives a first subframe. The first subframe comprises a first symbol and a second symbol. Each of the first and second symbols comprise a plurality of resource elements. One or more of the plurality of resource elements in the first symbol are reserved for reference signals. The first symbol carries control information and the second symbol carries a data transmission. In certain embodiments, the node may be one or more of a wireless device operating in downlink; a wireless device operating in a device-to-device scenario; and a network node operating in a wireless self-backhaul scenario. The control information may be carried on a PDCCH and the data transmission may be carried on PDCH. The first symbol may also carry data. In certain embodiments, the first and second symbols may be orthogonal frequency division multiplexing symbols, and the reference signals may comprise demodulation reference signals. The first subframe may include multiple orthogonal reference signals for a multiple-input-multiple-output (MIMO) transmission scheme.

At step 808, the node decodes the control information carried in the first symbol. In certain embodiments, the control information my be carried in one or more reserved resource elements that are not modulated with reference symbols, and decoding the control information may comprise: performing decoding as if the control information is mapped around the one or more reserved resource elements in the first symbol; and performing decoding as if the control information is mapped to the one or more reserved resource elements that are not modulated with reference symbols.

At step 812, the node obtains scheduling information from the decoded control information, the scheduling information indicating a location of the data transmission in frequency domain.

At step 816, the node determines, based on the location of the data transmission in frequency domain, which of the one or more reserved resource elements in the first symbol are modulated with reference symbols. In certain embodiments, the one or more reserved resource elements in the first symbol that are modulated with reference symbols comprise a subset of the one or more reserved resource elements that overlap in frequency domain the data transmission carried in the second symbol.

At step 820, the node performs one or more operations using the one or more reserved resource elements in the first symbol that are modulated with reference symbols. In the example embodiment of FIG. 8, the node performs channel estimation using the one or more reserved resource elements in the first symbol that are modulated with reference symbols. In certain embodiments, in addition to or instead of performing channel estimation, the node may decode the data transmission using the one or more reserved resource elements in the first symbol that are modulated with reference symbols. In some cases, performing channel estimation using the one or more reserved resource elements in the first symbol that are modulated with reference symbols may comprise decoding the data transmission using the one or more reserved resource elements in the first symbol that are modulated with reference symbols.

In certain embodiments, the method may comprise receiving a second subframe comprising a plurality of symbols, wherein the data transmission carried in the second symbol of the first subframe is a subframe aggregate data transmission that extends in time domain across at least one of the plurality of symbols of the second subframe. The method may comprise obtaining information indicating which of the plurality of symbols within the subframe aggregate data transmission contain reference signals.

Figure 9:
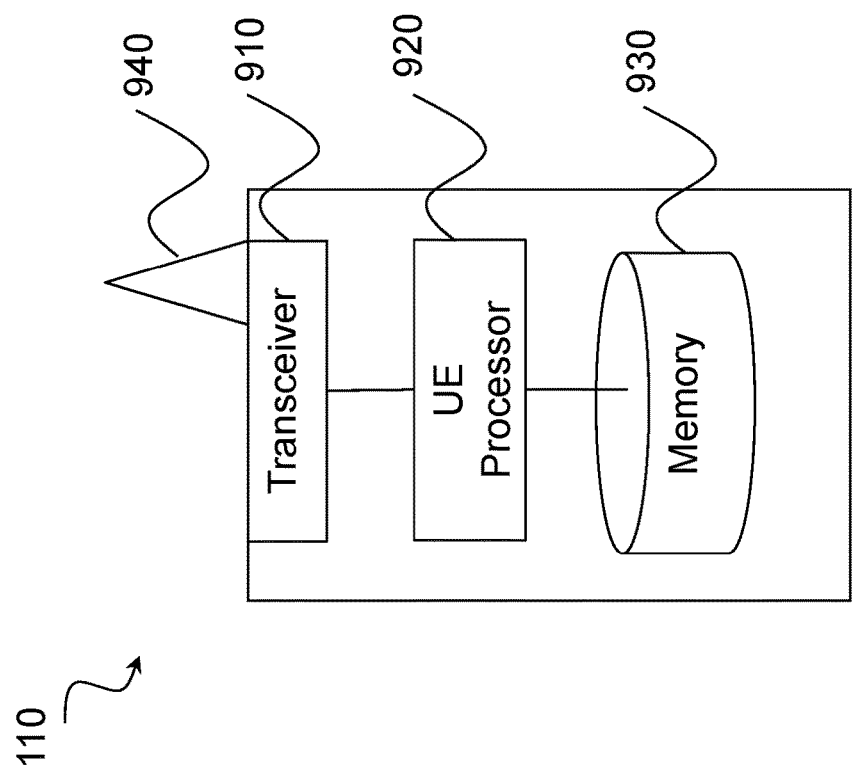
FIG. 9 is a schematic block diagram of an exemplary wireless device, in accordance with certain embodiments.

FIG. 9 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE 110, a station (STA), a device, or a terminal in some embodiments. Wireless device 110 includes transceiver 910, processor 920, and memory 930. In some embodiments, transceiver 910 facilitates transmitting wireless signals to and receiving wireless signals from network node 115 (e.g., via antenna 940), processor 920 executes instructions to provide some or all of the functionality described above as being provided by wireless device 110, and memory 930 stores the instructions executed by processor 920.

Processor 920 may include any suitable combination of hardware and software implemented in one or more modules to execute instructions and manipulate data to perform some or all of the described functions of wireless device 110, such as the functions of wireless device 110 described above in relation to FIGS. 1-8. In some embodiments, processor 920 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 920.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
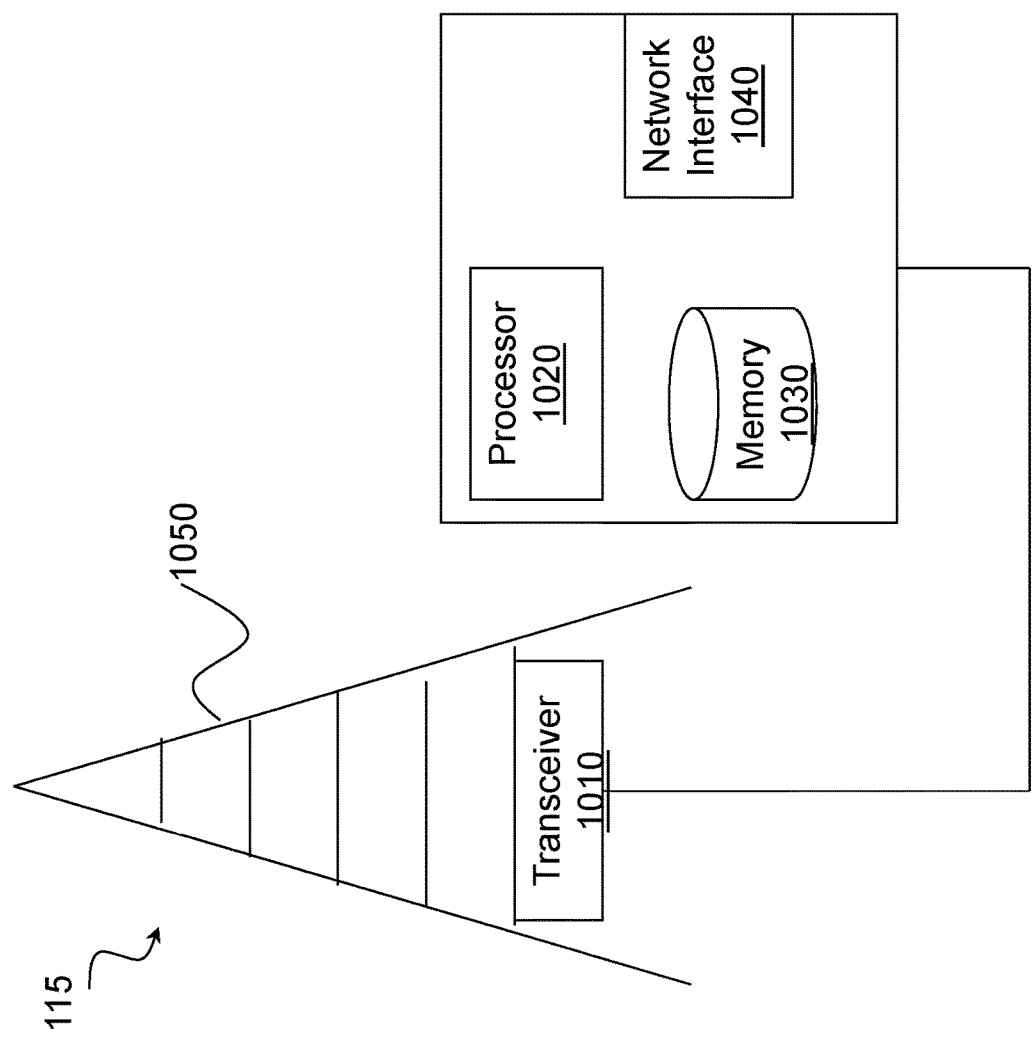
FIG. 10 is a schematic block diagram of an exemplary network node, in accordance with certain embodiments.

FIG. 10 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processor 1020, memory 1030, and network interface 1040. In some embodiments, transceiver 1010 facilitates transmitting wireless signals to and receiving wireless signals from wireless device 110 (e.g., via antenna 1050), processor 1020 executes instructions to provide some or all of the functionality described above as being provided by a network node 115, memory 1030 stores the instructions executed by processor 1020, and network interface 1040 communicates signals to backend network components, such as a gateway, switch, router, Internet, Public Switched Telephone Network (PSTN), core network nodes or radio network controllers 130, etc.

Processor 1020 may include any suitable combination of hardware and software implemented in one or more modules to execute instructions and manipulate data to perform some or all of the described functions of network node 115, such as those described above in relation to FIGS. 1-8 above. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 11:
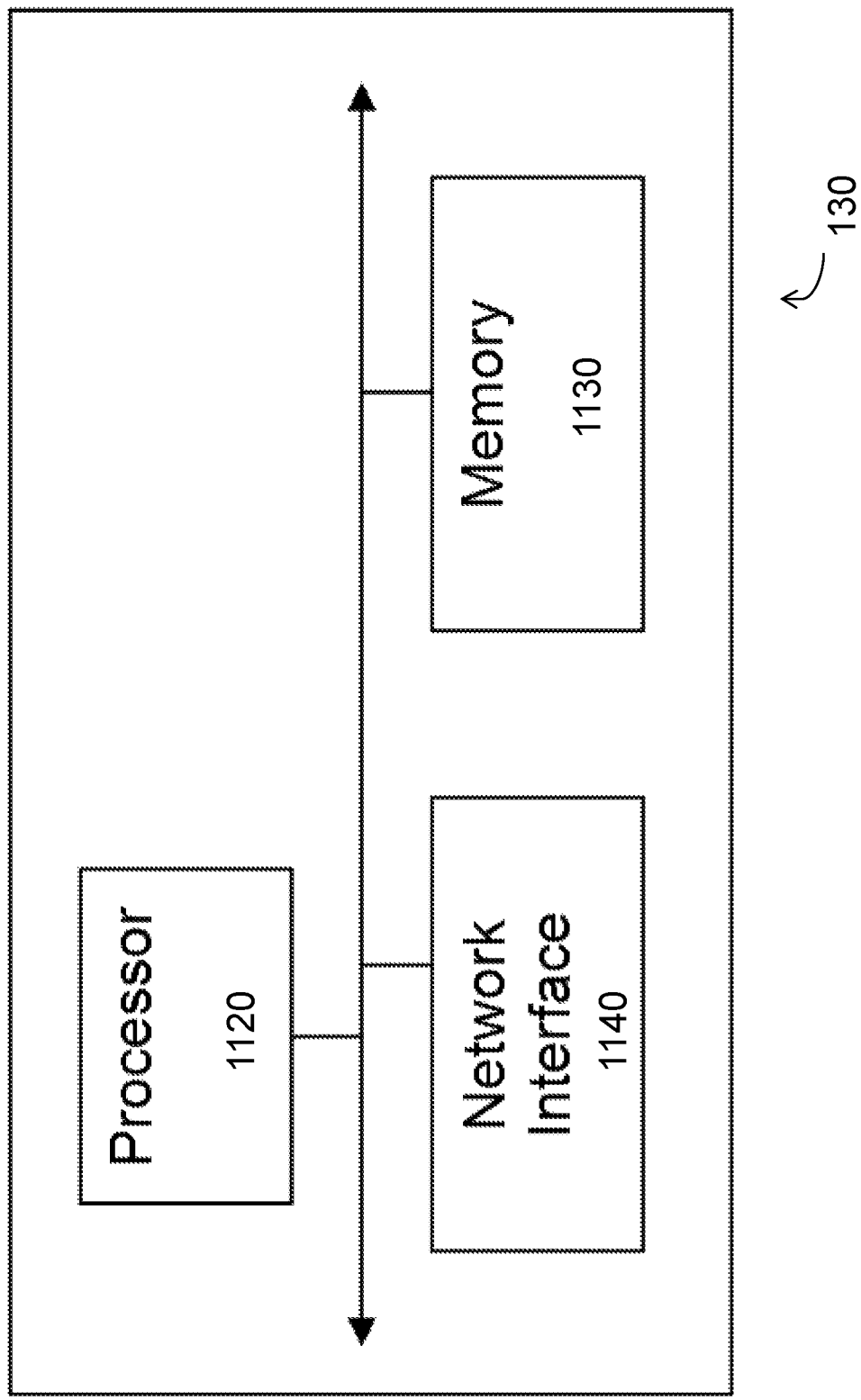
FIG. 11 is a schematic block diagram of an exemplary radio network controller or core network node, in accordance with certain embodiments.

FIG. 11 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to any suitable node, such as a gateway, switch, router, Internet, Public Switched Telephone Network (PSTN), network nodes 115, radio network controllers or core network nodes 130, etc.

Processor 1120 may include any suitable combination of hardware and software implemented in one or more modules to execute instructions and manipulate data to perform some or all of the described functions of the radio network controller or core network node 130. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Figure 12:
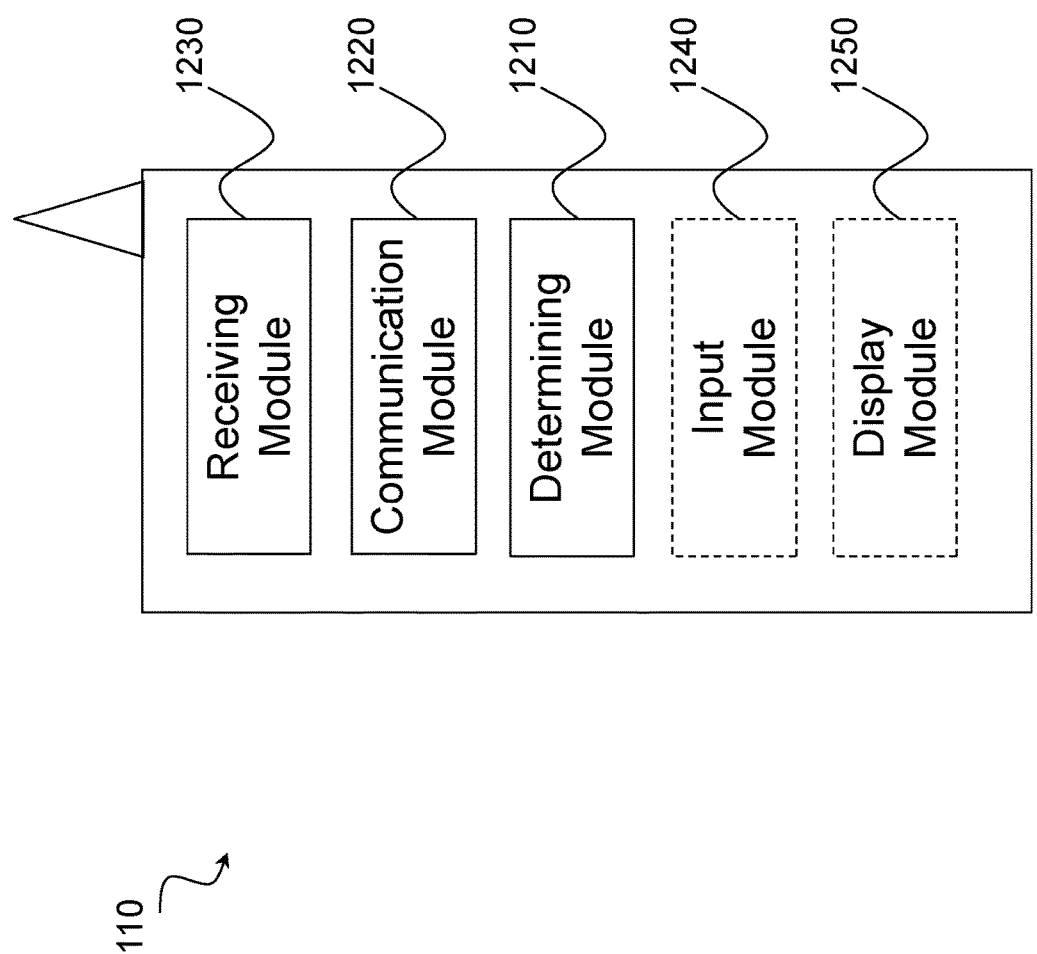
FIG. 12 is a schematic block diagram of an exemplary wireless device, in accordance with certain embodiments.

FIG. 12 is a block schematic of an exemplary wireless device, in accordance with certain embodiments. Wireless device 110 may include one or more modules. For example, wireless device 110 may include a determining module 1210, a communication module 1220, and a receiving module 1230. Optionally, wireless device 110 may include an input module 1240, a display module 1250, and any other suitable modules. Wireless device 110 may perform the reference signal pattern methods described above with respect to FIGS. 1-8.

Determining module 1210 may perform the processing functions of wireless device 110. In certain embodiments, wireless device 110 may perform any of the functions of the node described above with respect to FIGS. 1-8. In one example embodiment, determining module 1210 may generate a frame structure comprising at least a first subframe, the first subframe comprising a first symbol and a second symbol, each of the first and second symbols comprising a plurality of resource elements, wherein the first symbol carries control information and the second symbol carries a data transmission. Determining module 1210 may reserve one or more of the plurality of resource elements in the first symbol for reference signals. Determining module 1210 may modulate one or more of the reserved resource elements in the first symbol with reference symbols, the modulated one or more of the reserved resource elements in the first symbol comprising a subset of the one or more reserved resource elements that overlap in frequency domain the data transmission carried in the second symbol. Determining module 1210 may create multiple orthogonal reference signals for a multiple-input-multiple-output (MIMO) transmission scheme.

According to another example embodiment, determining module 1210 may decode the control information carried in the first symbol. Determining module 1210 may obtain scheduling information from the decoded control information, the scheduling information indicating a location of the data transmission in frequency domain. Determining module 1210 may determine, based on the location of the data transmission in frequency domain, which of the one or more reserved resource elements in the first symbol are modulated with reference symbols. Determining module 1210 may perform one or more operations using the one or more reserved resource elements in the first symbol that are modulated with reference symbols. As one example, determining module 1210 may perform channel estimation using the one or more reserved resource elements in the first symbol that are modulated with reference symbols. As another example, determining module 1210 may decode the data transmission using the one or more reserved resource elements in the first symbol that are modulated with reference symbols. Determining module 1210 may obtain information indicating which of the plurality of symbols within the subframe aggregate data transmission contain reference signals.

Determining module 1210 may include or be included in one or more processors, such as processor 920 described above in relation to FIG. 9. Determining module 1210 may include analog and/or digital circuitry configured to perform any of the functions of determining module 1210 and/or processor 920 described above. The functions of determining module 1210 described above may, in certain embodiments, be performed in one or more distinct modules.

Communication module 1220 may perform the transmission functions of wireless device 110. In certain embodiments, wireless device 110 may perform any of the functions of the node described above with respect to FIGS. 1-8. In one example embodiment, communication module 1220 may transmit the at least one subframe to another node. Communication module 1220 may communicate information indicating which of the plurality of symbols within a subframe aggregate data transmission contain reference signals.

Communication module 1220 may transmit messages to one or more of network nodes 115 of network 100. Communication module 1220 may include a transmitter and/or a transceiver, such as transceiver 910 described above in relation to FIG. 9. Communication module 1220 may include circuitry configured to wirelessly transmit messages and/or signals. In particular embodiments, communication module 1220 may receive messages and/or signals for transmission from determining module 1210. In certain embodiments, the functions of communication module 1220 described above may be performed in one or more distinct modules.

Receiving module 1230 may perform the receiving functions of wireless device 110. In certain embodiments, wireless device 110 may perform any of the functions of the node described above with respect to FIGS. 1-8. In one example embodiment, receiving module 1230 may receive a first subframe comprising a first symbol and a second symbol, each of the first and second symbols comprising a plurality of resource elements, one or more of the plurality of resource elements in the first symbol reserved for reference signals, wherein the first symbol carries control information and the second symbol carries a data transmission. Receiving module 1230 may receive a second subframe comprising a plurality of symbols, wherein the data transmission carried in the second symbol of the first subframe is a subframe aggregate data transmission that extends in time domain across at least one of the plurality of symbols of the second subframe. Receiving module 1230 may obtain information indicating which of the plurality of symbols within the subframe aggregate data transmission contain reference signals. Receiving module 1230 may include a receiver and/or a transceiver, such as transceiver 910 described above in relation to FIG. 9. Receiving module 1230 may include circuitry configured to wirelessly receive messages and/or signals. In particular embodiments, receiving module 1230 may communicate received messages and/or signals to determining module 1210.

Optionally, wireless device 110 may include input module 1240. Input module 1240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1210.

Optionally, wireless device 110 may include display module 1250. Display module 1250 may present signals on a display of wireless device 110. Display module 1250 may include the display and/or any appropriate circuitry and hardware configured to present signals on the display. Display module 1250 may receive signals to present on the display from determining module 1210.

Determining module 1210, communication module 1220, receiving module 1230, input module 1240, and display module 1250 may include any suitable configuration of hardware and/or software. Wireless device 110 may include additional modules beyond those shown in FIG. 12 that may be responsible for providing any suitable functionality, including any of the functionality described above and/or any additional functionality (including any functionality necessary to support the various solutions described herein).

Figure 13:
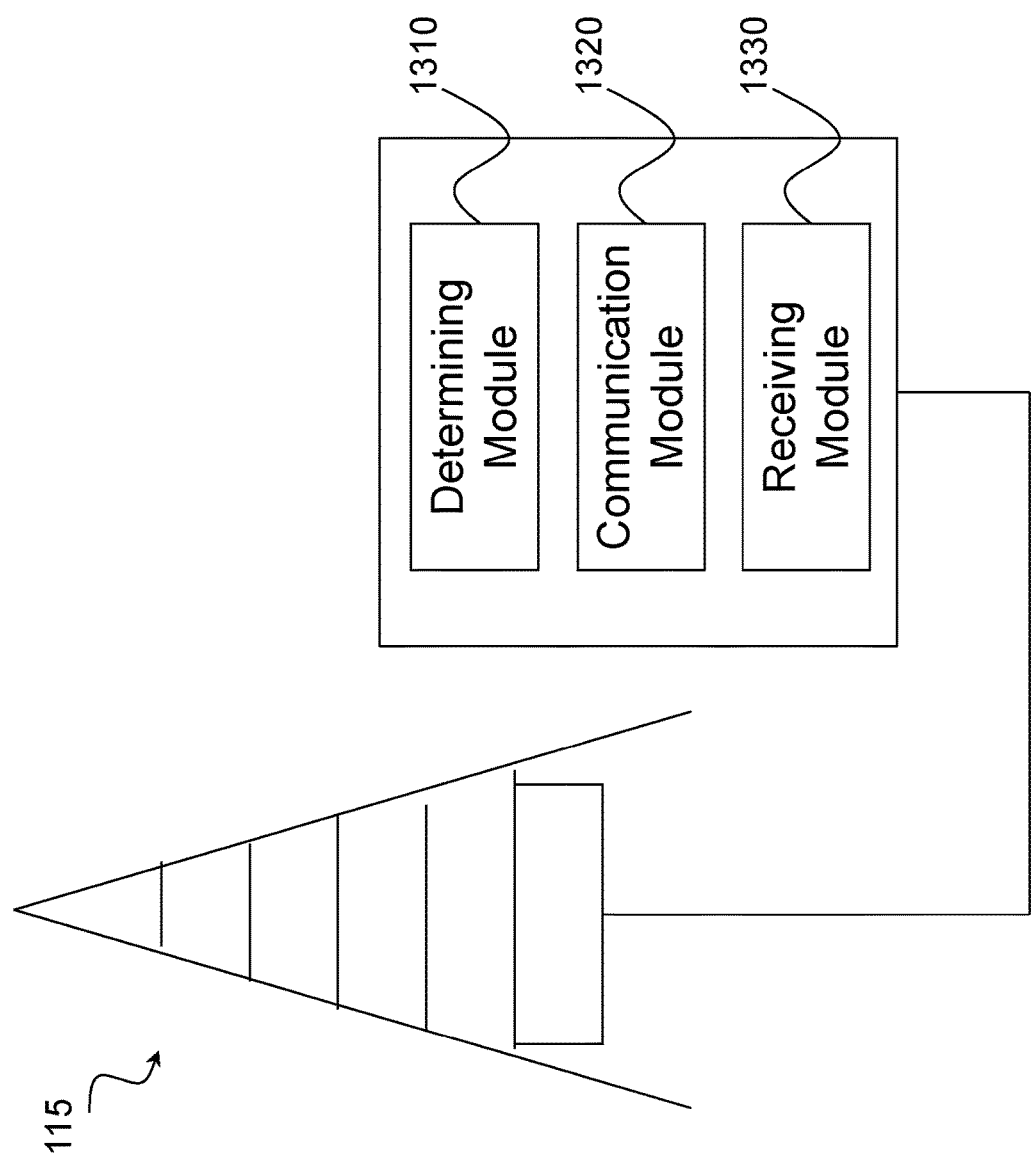
FIG. 13 is a schematic block diagram of an exemplary network node, in accordance with certain embodiments.

FIG. 13 is a block schematic of an exemplary network node 115, in accordance with certain embodiments. Network node 115 may include one or more modules. For example, network node 115 may include determining module 1310, communication module 1320, receiving module 1330, and any other suitable modules. In some embodiments, one or more of determining module 1310, communication module 1320, receiving module 1330, or any other suitable module may be implemented using one or more processors, such as processor 1020 described above in relation to FIG. 10. In certain embodiments, the functions of two or more of the various modules may be combined into a single module. Network node 115 may perform the reference signal pattern methods described above with respect to FIGS. 1-8.

Determining module 1310 may perform the processing functions of network node 115. In certain embodiments, network node 115 may perform any of the functions of the node described above with respect to FIGS. 1-8. In one example embodiment, determining module 1310 may generate a frame structure comprising at least a first subframe, the first subframe comprising a first symbol and a second symbol, each of the first and second symbols comprising a plurality of resource elements, wherein the first symbol carries control information and the second symbol carries a data transmission. Determining module 1310 may reserve one or more of the plurality of resource elements in the first symbol for reference signals. Determining module 1310 may modulate one or more of the reserved resource elements in the first symbol with reference symbols, the modulated one or more of the reserved resource elements in the first symbol comprising a subset of the one or more reserved resource elements that overlap in frequency domain the data transmission carried in the second symbol. Determining module 1310 may create multiple orthogonal reference signals for a multiple-input-multiple-output (MIMO) transmission scheme.

According to another example embodiment, determining module 1310 may decode the control information carried in the first symbol. Determining module 1310 may obtain scheduling information from the decoded control information, the scheduling information indicating a location of the data transmission in frequency domain. Determining module 1310 may determine, based on the location of the data transmission in frequency domain, which of the one or more reserved resource elements in the first symbol are modulated with reference symbols. Determining module 1310 may perform one or more operations using the one or more reserved resource elements in the first symbol that are modulated with reference symbols. As one example, determining module 1310 may perform channel estimation using the one or more reserved resource elements in the first symbol that are modulated with reference symbols. As another example, determining module 1310 may decode the data transmission using the one or more reserved resource elements in the first symbol that are modulated with reference symbols. Determining module 1310 may obtain information indicating which of the plurality of symbols within the subframe aggregate data transmission contain reference signals.

Determining module 1310 may include or be included in one or more processors, such as processor 1020 described above in relation to FIG. 10. Determining module 1310 may include analog and/or digital circuitry configured to perform any of the functions of determining module 1310 and/or processor 1020 described above. The functions of determining module 1310 may, in certain embodiments, be performed in one or more distinct modules. For example, in certain embodiments some of the functionality of determining module 1310 may be performed by an allocation module.

Communication module 1320 may perform the transmission functions of network node 115. In certain embodiments, network node 115 may perform any of the functions of the node described above with respect to FIGS. 1-8. In one example embodiment, communication module 1320 may transmit the at least one subframe to another node. Communication module 1320 may communicate information indicating which of the plurality of symbols within a subframe aggregate data transmission contain reference signals. Communication module 1320 may transmit messages to one or more of wireless devices 110. Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310 or any other module.

Receiving module 1330 may perform the receiving functions of network node 115. In certain embodiments, wireless device 110 may perform any of the functions of the node described above with respect to FIGS. 1-8. In one example embodiment, receiving module 1330 may receive a first subframe comprising a first symbol and a second symbol, each of the first and second symbols comprising a plurality of resource elements, one or more of the plurality of resource elements in the first symbol reserved for reference signals, wherein the first symbol carries control information and the second symbol carries a data transmission. Receiving module 1330 may receive a second subframe comprising a plurality of symbols, wherein the data transmission carried in the second symbol of the first subframe is a subframe aggregate data transmission that extends in time domain across at least one of the plurality of symbols of the second subframe. Receiving module 1330 may receive any suitable information from a wireless device. Receiving module 1330 may include a receiver and/or a transceiver, such as transceiver 1010 described above in relation to FIG. 10. Receiving module 1330 may include circuitry configured to wirelessly receive messages and/or signals. In particular embodiments, receiving module 1330 may communicate received messages and/or signals to determining module 1310 or any other suitable module.

Determining module 1310, communication module 1320, and receiving module 1330 may include any suitable configuration of hardware and/or software. Network node 115 may include additional modules beyond those shown in FIG. 13 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
BS Base Station
BSC Base Station Controller
BTS Base Transceiver Station
CAZAC Constant Amplitude Zero Auto Correlation
CDM Code Division Multiplexing
CPE Customer Premises Equipment
D2D Device-to-device
DAS Distributed Antenna System
DFTS-OFDM Discrete Fourier Transform Spread OFDM
DL Downlink
eNB evolved Node B
EPDCCH Enhanced Physical Downlink Control Channel
FDD Frequency Division Duplex
FDM Frequency Division Multiplexing
FBMC Filterbank Multicarrier
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MIMO Multiple Input Multiple Output
MSR Multi-standard Radio
NAS Non-Access Stratum
OCC Orthogonal Cover Code
OFDM Orthogonal Frequency Division Multiplexing
PDCH Physical Data Channel
PDCCH Physical Downlink Control Channel
PDSCH Physical Downlink Shared Channel
PSTN Public Switched Telephone Network
PUSCH Physical Uplink Shared Channel
PUCCH Physical Uplink Control Channel
RB Resource Block
RNC Radio Network Controller
RRC Radio Resource Control
RRH Remote Radio Head
RRU Remote Radio Unit
SC-FDMA Single Carrier Frequency Division Multiple Access
TDD Time Division Duplex
UE User Equipment
UL Uplink
WAN Wide Area Network

The invention claimed is:

1. A method in a node, comprising:
generating a frame structure comprising at least a first subframe, the first subframe comprising a first symbol and a second symbol, each of the first and second symbols comprising a plurality of resource elements, wherein the first symbol carries control information and the second symbol carries a data transmission;
reserving one or more of the plurality of resource elements in the first symbol for reference signals, wherein the resource elements reserved for reference symbols comprise a first subset of resource elements that overlap in frequency domain with the data transmission carried in the second symbol and a second subset of resource elements that do not overlap in frequency domain with the data transmission carried in the second symbol;
modulating one or more of the first subset of reserved resource elements in the first symbol with reference symbols; and
transmitting the at least one subframe to another node.

2. The method of claim 1, wherein:
the frame structure further comprises a second subframe comprising a plurality of symbols;
the data transmission carried in the second symbol of the first subframe is a subframe aggregate data transmission that extends in time domain across at least one of the plurality of symbols of the second subframe; and
the method comprises communicating information indicating which of the plurality of symbols within the subframe aggregate data transmission contain reference signals.

3. The method of claim 1, comprising creating multiple orthogonal reference signals far a multiple-input-multiple-output (MIMO) transmission scheme.

4. The method of claim 3, wherein creating multiple orthogonal reference signals for the MIMO transmission scheme comprises one or more of:
  using frequency division multiplexing to separate reference signals;
  using code division multiplexing to separate reference signals; and
  using orthogonal cover codes between the reserved resource elements modulated with reference symbols in the first symbol and one or more of the plurality of resource elements in the second symbol.

5. The method of claim 1, wherein:
  the first and second symbols are orthogonal frequency division multiplexing symbols; and
  the reference signals comprise demodulation reference signals.

6. The method of claim 1, wherein the node comprises one of:
  a network node; and
  a wireless device operating in a device-to-device scenario.

7. The method of claim 1, wherein the control information is carried on a Physical Downlink Control Channel and the data transmission is carried on a Physical Data Channel.

8. The method of claim 1, wherein the first symbol also carries data.

9. The method of claim 1, wherein the control information is carried in one or more reserved resource elements that are not modulated with reference symbols.

10. A method in a node, comprising:
  receiving a first subframe comprising a first symbol and a second symbol, each of the first and second symbols comprising a plurality of resource elements, one or more of the plurality of resource elements in the first symbol reserved for reference signals, wherein the first symbol carries control information and the second symbol carries a data transmission;
  decoding the control information carried in the first symbol;
  obtaining scheduling information from the decoded control information, the scheduling information indicating a location of the data transmission in frequency domain;
  determining, based on the location of the data transmission in frequency domain, which of the one or more reserved resource elements in the first symbol are modulated with reference symbols; and
  performing channel estimation using the one or more reserved resource elements in the first symbol that are modulated with reference symbols.

11. The method of claim 10, wherein the one or more reserved resource elements in the first symbol that are modulated with reference symbols comprise a subset of the one or more reserved resource elements that overlap in frequency domain the data transmission carried in the second symbol.

12. The method of claim 10, comprising:
  receiving a second subframe comprising a plurality of symbols, wherein the data transmission carried in the second symbol of the first subframe is a subframe aggregate data transmission that extends in time domain across at least one of the plurality of symbols of the second subframe; and
  obtaining information indicating which of the plurality of symbols within the subframe aggregate data transmission contain reference signals.

13. The method of claim 10, wherein the first subframe includes multiple orthogonal reference signals for a multiple-input-multiple-output (MIMO) transmission scheme.

14. The method of claim 10, wherein:
  the first and second symbols are orthogonal frequency division multiplexing symbols; and
  the reference signals comprise demodulation reference signals.

15. The method of claim 10, wherein the node comprises one of:
  a wireless device operating in downlink;
  a wireless device operating in a device-to-device scenario; and
  a network node operating in a wireless self-backhaul scenario.

16. The method of claim 10, wherein the control information is carried on a Physical Downlink Control Channel and the data transmission is carried on a Physical Data Channel.

17. The method of claim 10, wherein the first symbol also carries data.

18. The method of claim 10, wherein the control information is carried in one or more reserved resource elements that are not modulated with reference symbols, and decoding the control information comprises:
  performing decoding as if the control information is mapped around the one or more reserved resource elements in the first symbol; and
  performing decoding as if the control information is mapped to the one or more reserved resource elements that are not modulated with reference symbols.

19. The method of claim 10, wherein performing channel estimation using the one or more reserved resource elements in the first symbol that are modulated with reference symbols comprises:
  decoding the data transmission using the one or more reserved resource elements in the first symbol that are modulated with reference symbols.

20. A node, comprising:
  one or more processors, the one or more processors configured to:
  generate a flame structure comprising at least a first subframe, the first subframe comprising a first symbol and a second symbol, each of the first and second symbols comprising a plurality of resource elements, wherein the first symbol carries control information and the second symbol carries a data transmission;
  reserve one or more of the plurality of resource elements in the first symbol for reference signals, wherein the resource elements reserved for reference symbols comprise a first subset of resource elements that overlap in frequency domain with the data transmission carried in the second symbol and a second subset of resource elements that do not overlap in frequency domain with the data transmission carried in the second symbol;
  modulate one or more of the first subset of reserved resource elements in the first symbol with reference symbols; and
  transmit the at least one subframe to another node.

21. A node, comprising:
  one or more processors, the one or more processors configured to:
  receive a first subframe comprising a first symbol and a second symbol, each of the first and second symbols comprising a plurality of resource elements, one or more of the plurality of resource elements in the first symbol reserved for reference signals, wherein the first symbol carries control information and the second symbol carries a data transmission;

decode the control information carried in the first symbol;

obtain scheduling information from the decoded control information, the scheduling information indicating a location of the data transmission in frequency domain;

determine, based on the location of the data transmission in frequency domain, which of the one or more reserved resource elements in the first symbol are modulated with reference symbols; and perform channel estimation using the one or more reserved resource elements in the first symbol that are modulated with reference symbols.

\* \* \* \* \*